(12) United States Patent
Zhao

(10) Patent No.: US 9,817,215 B2
(45) Date of Patent: Nov. 14, 2017

(54) PHOTOGRAPHING LENS SYSTEM AND PHOTOGRAPHING APPARATUS INCLUDING THE SAME

(71) Applicant: Samsung Electronics Co., Ltd., Gyeonggi-do (KR)

(72) Inventor: Liefeng Zhao, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/013,116

(22) Filed: Feb. 2, 2016

(65) Prior Publication Data

US 2016/0223797 A1 Aug. 4, 2016

(30) Foreign Application Priority Data

Feb. 4, 2015 (KR) .................... 10-2015-0017602

(51) Int. Cl.
*G02B 3/02* (2006.01)
*G02B 13/18* (2006.01)
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .......... G02B 13/18; G02B 13/04; G02B 3/04
USPC ................................. 359/708, 713
See application file for complete search history.

(56) References Cited

U.S. PATENT DOCUMENTS

| | | |
|---|---|---|
| 6,636,364 B2 | 10/2003 | Sato |
| 8,432,619 B2 | 4/2013 | Huang |
| 8,472,128 B2 * | 6/2013 | Huang .......................... 359/713 |
| 2014/0211327 A1 | 7/2014 | Chen et al. |

* cited by examiner

*Primary Examiner* — James Greece
(74) *Attorney, Agent, or Firm* — Cha & Reiter, LLC

(57) ABSTRACT

A photographing lens system and a photographing apparatus including the same are provided. In the photographing lens system, as arranged in an order from an object side to an image side, a first lens having at least one inflection point, a second lens having a refractive power, a third lens having a positive refractive power, a fourth lens having a refractive power, a fifth lens having at least one aspherical surface, and a sixth lens having at least one aspherical surface.

35 Claims, 21 Drawing Sheets

PHOTOGRAPHING LENS SYSTEM AND PHOTOGRAPHING APPARATUS INCLUDING THE SAME

CLAIM OF PRIORITY

This application claims the benefit under 35 U.S.C. 119(b) of Korean Patent Application No. 10-2015-0017602, filed on Feb. 4, 2015, in the Korean Intellectual Property Office, the disclosure of which is incorporated herein in its entirety by reference.

BACKGROUND

One or more exemplary embodiments relate to a compact photographing lens system comprising six lenses, and a photographing apparatus including the compact photographing lens system.

Photographing apparatuses such as digital still cameras, video cameras, and interchangeable lens cameras can use solid state imaging devices such as charged coupled device (CCD) image sensors or complementary metal oxide semiconductor (CMOS) image sensors. Solid-state imaging devices are suitable for incorporation into integrated circuits and accordingly, can be placed in compact devices such as mobile phones. There is user demand for high performance photographing apparatuses in terms of, for example, high resolution or wide angle. Furthermore, user expertise with respect to cameras has continuously increased.

As photographing devices are being integrated into increasingly smaller chips and being capable higher resolution pictures, high resolution and high performance photographing lens are desirable. However, it is difficult to realize the high specification performance required by users of photographing lens systems with four or five lenses. Particularly, it is difficult to mount a photographing lens system satisfying the required optical properties and aberration characteristics on a slimmed-down portable terminal.

SUMMARY

One or more exemplary embodiments include a photographing lens system that is compact and has high performance specifications.

One or more exemplary embodiments include a photographing apparatus including a photographing lens system that is compact and has high performance specifications.

Additional aspects will be set forth in part in the description which follows and, in part, will be apparent from the description, or may be learned by practice of the presented exemplary embodiments.

According to one or more exemplary embodiments, a photographing lens system includes a first lens having at least one inflection point, an object side surface that is concave in an area around an optical axis, and an image side surface that is convex toward an image side, a second lens having a refractive power, a third lens having a positive refractive power, a fourth lens having a refractive power, a fifth lens having a refractive power and an image side surface that is convex toward the image side, wherein at least one of an object side surface and the image side surface of the fifth lens is an aspherical surface, and a sixth lens having a refractive power and an image side surface that is concave toward the image side, wherein at least one of an object side surface and the image side surface of the sixth lens is an aspherical surface, in which the first to sixth lenses are arranged in an order from an object side to the image side.

The photographing lens system may include an aperture provided at least one position between the first lens and the third lens.

The aperture may be provided between the second lens and the third lens.

The photographing lens system may satisfy an inequality that |F1|/EFL>1, in which "F1" denotes a focal length of the first lens and "EFL" denotes a total focal length of the photographing lens system.

The photographing lens system may satisfy an inequality that |F2|/EFL>1, in which "F2" denotes a focal length of the second lens and "EFL" denotes a total focal length of the photographing lens system.

The photographing lens system may satisfy an inequality that 0<F3/EFL<5, in which "F3" denotes a focal length of the third lens and "EFL" denotes a total focal length of the photographing lens system.

The fourth lens may include the object side surface that is concave toward the object side.

The photographing lens system may satisfy an inequality that 0.1<T4/T3<1, in which "T4" denotes a central thickness of the fourth lens and "T3" denotes a central thickness of the third lens.

The photographing lens system may satisfy an inequality that Vd4/Vd3<1, in which "Vd4" denotes an Abbe number of the fourth lens and "Vd3" denotes an Abbe number of the third lens.

The photographing lens system may satisfy an inequality that |R51/R52|>1, in which "R51" denotes a radius of curvature of the object side surface of the fifth lens and "R52" denotes a radius of curvature of the image side surface of the fifth lens.

The sixth lens may include the object side surface that is convex toward the object side.

The sixth lens may have at least one inflection point on the image side surface.

Each of the first to sixth lenses may have at least one aspherical surface.

Each of the first to sixth lenses may include a plastic lens.

The photographing lens system may satisfy an inequality that IND-L4>1.6, in which "IND-L4" denotes a refractive index of the fourth lens.

The photographing lens system may satisfy an inequality that 80<FOV<160 (degrees), in which "FOV" denotes an angle of view.

According to one or more exemplary embodiments, a photographing lens system includes a first lens having a meniscus shape that is concave toward an object side in an area around an optical axis, a second lens having a refractive power, a third lens having a positive refractive power, a fourth lens having a refractive power, a fifth lens having a positive refractive power and an image side surface that is convex toward an image side, in which at least one of an object side surface and the image side surface of the fifth lens is an aspherical surface, and a sixth lens having a refractive power and an image side surface that is concave toward the image side, in which at least one of an object side surface and the image side surface of the sixth lens is an aspherical surface, in which the first to sixth lenses are arranged in an order from the object side to the image side.

The photographing lens system may include an aperture provided at least one position between the first lens and the third lens.

The aperture may be provided between the second lens and the third lens.

The photographing lens system may satisfy an inequality that |F1|/EFL>1, in which "F1" denotes a focal length of the first lens and "EFL" denotes a total focal length of the photographing lens system.

The photographing lens system may satisfy an inequality that |F2|/EFL>1, in which "F2" denotes a focal length of the second lens and "EFL" denotes a total focal length of the photographing lens system.

According to one or more exemplary embodiments, a photographing lens system includes a first lens having a meniscus shape that is concave toward an object side in an area around an optical axis, a second lens having a refractive power, a third lens having a positive refractive power, a fourth lens having a refractive power, a fifth lens having a positive refractive power and an image side surface that is convex toward an image side, in which at least one of an object side surface and the image side surface of the fifth lens is an aspherical surface, and a sixth lens having a refractive power and an image side surface that is concave toward the image side, in which at least one of an object side surface and the image side surface of the sixth lens is an aspherical surface, in which the first to sixth lenses are arranged in an order from the object side to the image side, and the photographing lens system has a viewing angle in a range between about 80° to about 160°.

The photographing lens system may satisfy an inequality that 0<F3/EFL<5, in which "F3" denotes a focal length of the third lens and "EFL" denotes a total focal length of the photographing lens system.

The fourth lens may include the object side surface that is concave toward the object side.

The photographing lens system may satisfy an inequality that 0.1<T4/T3<1, in which "T4" denotes a central thickness of the fourth lens and "T3" denotes a central thickness of the third lens.

The photographing lens system may satisfy an inequality that Vd4/Vd3<1, in which "Vd4" denotes an Abbe number of the fourth lens and "Vd3" denotes an Abbe number of the third lens.

The photographing lens system may satisfy an inequality that |R51/R52|>1, in which "R51" denotes a radius of curvature of the object side surface of the fifth lens and "R52" denotes a radius of curvature of the image side surface of the fifth lens.

The sixth lens may include the object side surface that is convex toward the object side.

The sixth lens may have at least one inflection point on the image side surface.

Each of the first to sixth lenses may have at least one aspherical surface.

Each of the first to sixth lenses may include a plastic lens.

The photographing lens system may satisfy an inequality that IND-L4>1.6, in which "IND-L4" denotes a refractive index of the fourth lens.

The photographing lens system may satisfy an inequality that 80<FOV<160 (degrees), in which "FOV" denotes a viewing angle.

According to one or more exemplary embodiments, a photographing lens system includes a first lens having a meniscus shape that is concave toward an object side in an area around an optical axis, a second lens having a refractive power, a third lens having a positive refractive power, a fourth lens having a refractive power, a fifth lens having a positive refractive power and an image side surface that is convex toward the image side, in which at least one of an object side surface and the image side surface of the fifth lens is an aspherical surface, and a sixth lens having a refractive power and an image side surface that is concave toward the image side, in which at least one of an object side surface and the image side surface of the sixth lens is an aspherical surface, in which the first to sixth lenses are arranged in an order from the object side to the image side, and the photographing lens system satisfies an inequality that −0.25<EFL/F12<0.25, in which "F12" denotes a synthetic focal length of the first and second lenses and "EFL" denotes a total focal length of the photographing lens system.

According to one or more exemplary embodiments, a photographing apparatus includes a photographing lens system, and an image sensor receiving an image formed by the photographing lens system and converting a received image to an electric image signal, in which the photographing lens system includes a first lens having at least one inflection point, an object side surface that is concave in an area around an optical axis, and an image side surface that is convex toward an image side, a second lens having a refractive power, a third lens having a positive refractive power, a fourth lens having a refractive power, a fifth lens having a refractive power and an image side surface that is convex toward the image side, in which at least one of an object side surface and the image side surface of the fifth lens is an aspherical surface, and a sixth lens having a refractive power and an image side surface that is concave toward the image side, in which at least one of an object side surface and the image side surface of the sixth lens is an aspherical surface, in which the first to sixth lenses are arranged in an order from an object side to the image side.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
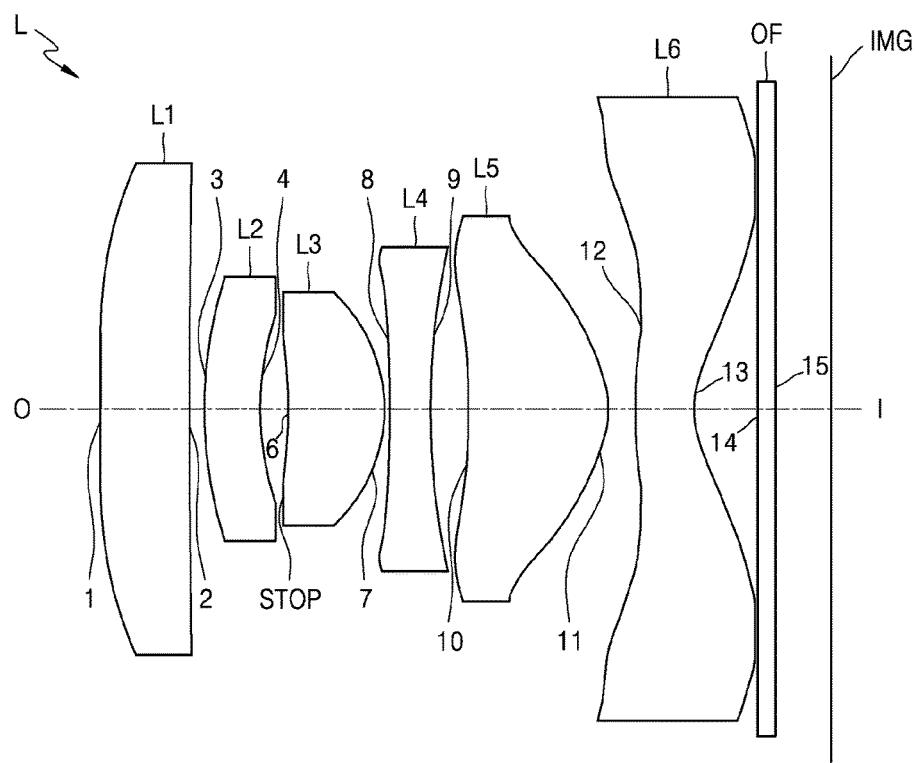
FIG. 1 illustrates a photographing lens according to an embodiment.

Reference will now be made in detail to embodiments, which are illustrated in the accompanying drawings, wherein like reference numerals refer to like elements throughout. In this regard, the present exemplary embodiments may have different forms and should not be construed as being limited to the descriptions set forth herein. Accordingly, the embodiments are described below, by referring to the figures, to explain aspects of the present description. Expressions such as "at least one of," when preceding a list of elements, modify the entire list of elements and do not modify the individual elements of the list.

Hereinafter, a photographing lens system according to an embodiment, and a photographing apparatus having the photographing lens system, are described in detail with reference to the accompanying drawings.

FIG. 1 illustrates a cross-sectional view of photographing lens system L according to an embodiment of the present disclosure. The lens system L is formed by each of the shown figures 360 degrees about an axis connecting points O and I, known as the optical axis.

The photographing lens system L may include a first lens L1, a second lens L2, a third lens L3, a fourth lens L4, a fifth lens L5, and a sixth lens L6, which are arranged in an order from an object side O to an image side I. In the following description, the image side may indicate a direction toward an image plane where an image is formed, whereas the object side may indicate a direction toward an object. Also, an object side surface of a lens may denote a lens surface at a side where the object is located, whereas an image side surface of a lens may denote a lens surface at a side where the image plane is located.

The first lens L1 may have at least one inflection point on the object side surface. The inflection point may indicate a point where the sign of a radius of curvature changes from (+) to (−), or vice versa. Alternatively, the inflection point may indicate a point where the shape of a lens changes from convexity to concavity, or vice versa. The first lens L1 may have, for example, a meniscus shape that is concave toward the object side in an area around an optical axis, that is, within a predetermined radius from the optical axis. The first lens L1 may have, around the optical axis, an object side surface that is concave toward the object side and an image side surface that is convex toward the image side. The object side surface of the first lens L1 has a concave shape around the optical axis and a convex shape at a position farther from the optical axis. The image side surface of the first lens L1 may have a convex shape around the optical axis and a convex shape at a position farther from the optical axis. The first lens L1 may have a positive refractive power or a negative refractive power.

The second lens L2 may include, for example, an object side surface that is convex toward the object side O. The second lens L2 may have, for example, a meniscus shape that is convex toward the object side O. The second lens L2 may have a positive refractive power or a negative refractive power. The second lens L2 can be adjacent to the first lens L1.

The third lens L3 may have, for example, a positive refractive power. The third lens L3 may have an image side surface that is convex toward the image side I. An object side surface of the third lens L3 may be convex or concave. The third lens L3 can be adjacent to the second lens L2.

The fourth lens L4 may have a positive refractive power or a negative refractive power. The fourth lens L4 may include an object side surface that is concave toward the object side O. The fourth lens L4 may include, for example, an image side surface that is concave or convex toward the image side, although image side surface is shown concave in FIG. 1. The fourth lens L4 may be, for example, a biconcave lens or a meniscus lens that is concave toward the object side. The fourth lens L4 can be adjacent to the third lens L3.

The fifth lens L5 may have a positive refractive power or a negative refractive power. The fifth lens L5 may include an image side surface that is convex toward the image side I. The fifth lens L5 may have, for example, a positive refractive power. The fifth lens L5 may include, for example, an object side surface that is concave or convex toward the object side O, although object side surface is shown to be concave in FIG. 1. For example, the fifth lens L5 may include at least one aspherical surface. The fifth lens can be adjacent to the fourth lens The sixth lens L6 may have a positive refractive power or a negative refractive power. For example, the sixth lens L6 may have may have a negative refractive power. The sixth lens L6 may include an object side surface that is convex toward the object side. The sixth lens L6 may include an image side surface that is concave toward the image side I. For example, the image side surface of the sixth lens L6 may have a concave shape in an area around an optical axis. The sixth lens L6 may include at least one aspherical surface. The sixth lens L6 may have at least one inflection point on at least one of the object side surface and the image side surface. As the sixth lens L6 has at least one inflection point and an aspherical surface, various aberration corrections may be well performed. The sixth lens L6 can be adjacent to the fifth lens L5.

An image of the object may be incident on an image plane IMG by passing through the first lens L1, the second lens L2, the third lens L3, the fourth lens L4, the fifth lens L5, and the sixth lens L6. The image plane IMG may be, for example, a surface of a photographing device or a surface of an image sensor. An image sensor may include, for example, a CMOS or a CCD.

At least one optical filter OF may be provided between the sixth lens L6 and the image plane IMG. The optical filter OF may include, for example, at least one of a low pass filter, an infrared ray (IR)-cut filter, and a cover glass. For example, when an IR-cut filter is employed as the optical filter OF, the IR-cut filter has visible rays transmitted and infrared rays radiated outwardly so that the infrared rays may not be transferred to the image plane. However, the photographing lens system L may be configured without the optical filter OF.

Meanwhile, the photographing lens system L may include at least one aperture STOP. For example, the aperture STOP may be provided at least one position between the first lens L1 and the third lens L3. For example, the aperture STOP may be provided between the second lens L2 and the third lens L3.

Each of the first lens L1, the second lens L2, the third lens L3, the fourth lens L4, the fifth lens L5 and the sixth lens L6 may include at least one aspherical surface. For example, each of the first lens L1, the second lens L2, the third lens L3, the fourth lens L4, the fifth lens L5, and the sixth lens L6 may be a bi-aspheric surface lens. Accordingly, the photographing lens system L is compact and has a high resolution. In addition, at least one of the first lens L1, the second lens L2, the third lens L3, the fourth lens L4, the fifth lens L5, and the sixth lens L6 is formed of a plastic material and thus costs may be saved and manufacturing of an aspherical surface may be made easy. For example, each of the first lens L1, the second lens L2, the third lens L3, the fourth lens L4, the fifth lens L5, and the sixth lens L6 may be a plastic lens.

The photographing lens system L according to the present embodiment may satisfy the following inequality.

$|F1|/EFL>1$  <Inequality 1>

In Inequality 1, "F1" denotes a focal length of the first lens L1, and "EFL" denotes a total focal length of the photographing lens system L. Alternatively, the magnitude of the focal length of lens L1 exceeds the focal length of the photographing lens system L.

The photographing lens system L according to the present embodiment may satisfy the following inequality.

$|F2|/EFL>1$  <Inequality 2>

In Inequality 2, "F2" denotes a focal length of the second lens L2, and "EFL" denotes a total focal length of the photographing lens system L. Alternatively, the magnitude of the focal length of lens L2 exceeds the focal length of the photographing lens system L.

The photographing lens system L according to the present embodiment may satisfy the following inequality.

$-0.25<EFL/F12<0.25$  <Inequality 3>

In Inequality 3, "F12" denotes a synthetic focal length of the first lens L1 and the second lens L2, and "EFL" denotes a total focal length of the photographing lens system L.

The photographing lens system L according to an embodiment may satisfy the following inequality.

$0<F3/EFL<5$  <Inequality 4>

In Inequality 4, "F3" denotes a focal length of the third lens L3, and "EFL" denotes a total focal length of the photographing lens system L.

As the photographing lens system L adjusts a distribution of refractive powers of the first to sixth lenses L1 to L6 according to at least one of Inequalities 1, 2, 3, and 4, with the size reduction of the photographing lens system L, curvature of field is corrected so that superior optical performance may be embodied.

The photographing lens system L according to the present embodiment may satisfy the following inequality.

$0.1<T4/T3<1$  <Inequality 5>

In Inequality 5, "T4" denotes a central thickness of the fourth lens L4, and "T3" denotes a central thickness of the third lens L3.

The photographing lens system L according to the present embodiment may satisfy the following inequality.

$Vd4/Vd3<1$  <Inequality 6>

In Inequality 6, "Vd4" denotes the Abbe number of the fourth lens L4, and "Vd3" denotes the Abbe number of the third lens L3.

When the photographing lens system L satisfies Inequalities 5 and 6, with the size reduction of the photographing lens system L, chromatic aberration may be easily corrected.

The photographing lens system L according to the present embodiment may satisfy the following inequality.

$|R51/R52|>1$  <Inequality 7>

In Inequality 7, "R51" denotes a radius of curvature of the object side surface of the fifth lens L5, and "R52" denotes a radius of curvature of the image side surface of the fifth lens L5.

Inequality 7 limits a ratio of a radius of curvature of the object side surface of the fifth lens L5 to a radius of curvature of the image side surface of the fifth lens L5. When |R51/R52| satisfies Inequality 7, with the size reduction of the photographing lens system L, aberration is corrected so that optical performance may be improved.

The photographing lens system L according to the present embodiment may satisfy the following inequality.

$80<FOV<160$ (degrees)  <Inequality 8>

In Inequality 8, "FOV" denotes an angle of view.

The photographing lens system L according to the present embodiment may satisfy the following inequality.

$1.0<EFL/EPD<2.0$  <Inequality 9>

In Inequality 9, "ELF" denotes a focal length of the photographing lens system L, and "EPD" denotes a diameter of an entrance pupil. When "EFL/EPD" satisfies Inequality 9, a clear image may be obtained at a low illuminance.

The photographing lens system L according to the present embodiment may satisfy the following inequality.

$IND\text{-}L4>1.6$  <Inequality 10>

In Inequality 10, "IND-L4" denotes a refractive index of the fourth lens L4. When "IND-L4" satisfies Inequality 10, chromatic aberration may be easily corrected.

Meanwhile, an aspherical surface used for the photographing lens system L according to the present inventive concept is defined as follows.

The shape of an aspherical surface may be expressed by the following equation on an assumption that an optical axis direction is x, a direction perpendicular to the optical axis direction is y, and a direction in which a light ray proceeds is positive. In the following equation, "x" denotes a distance from an apex of a lens in the optical axis direction, "y" is a distance in a direction perpendicular to the optical axis, "K" is a conic constant, "A", "B", "C", "D", . . . denote aspherical surface coefficients, and "c" denotes a reciprocal (1/R) of a radius of curvature at the apex of a lens.

$$x = \frac{cy^2}{1+\sqrt{1-(K+1)c^2y^2}} + Ay^4 + By^6 + Cy^8 + Dy^{10} + \ldots \quad \text{(Equation 11)}$$

In the present inventive concept, photographing lens systems may be as follows through the illustrated embodiments according to various designs.

In each numerical embodiment, lens surface numbers 1, 2, 3, . . . , n, where "n" is a natural number, are sequentially and linearly assigned from the object side O to the image side I. "EFL" denotes a focal length of the photographing lens system L, "F-number" denotes an F number, "FOV" denotes an angle of view, "R" denotes a radius of curvature, "Dn" denotes a thickness of a lens or an air space between lenses, "Nd" denotes a refractive index, "Vd" denotes an Abbe number, "STOP" denotes an aperture, and "*" denotes an aspherical surface.

FIG. 1 illustrates a photographing lens system according to one embodiment. Design data of the embodiment are shown below.

EFL=2.08 mm; F-number=1.99; FOV=90 degrees

TABLE 1

| Lens Surface | R (mm) | Dn (mm) | Nd | Vd | Effective Diameter (mm) |
|---|---|---|---|---|---|
| 1* | −17.376 | 0.550 | 1.545 | 56.1 | 3.0 |
| 2* | −12.658 | 0.082 | | | 2.4 |
| 3* | 1.578 | 0.342 | 1.651 | 21.5 | 1.6 |
| 4* | 1.601 | 0.139 | | | 1.1 |
| STOP | infinity | 0.030 | | | 1.0 |
| 6* | −11.979 | 0.587 | 1.545 | 56.1 | 1.0 |
| 7* | −0.965 | 0.030 | | | 1.4 |
| 8* | −234.267 | 0.250 | 1.651 | 21.5 | 1.7 |
| 9* | 2.202 | 0.232 | | | 2.0 |
| 10* | −3.887 | 0.849 | 1.545 | 56.1 | 2.1 |
| 11* | −0.759 | 0.164 | | | 2.3 |
| 12* | 1.791 | 0.368 | 1.554 | 41.3 | 3.1 |
| 13* | 0.589 | 0.379 | | | 3.8 |
| 14 | infinity | 0.110 | 1.517 | 64.2 | 3.9 |
| 15 | infinity | 0.288 | | | 4.0 |
| IMG | | 0.050 | | | 4.3 |

Where lens surface:
1 is the object side surface of lens L1
2 is the image side surface of lens L1
3 is the object side surface of lens L2
4 is the image side surface of lens L2
6 is the object side surface of lens L3
7 is the image side surface of lens L3
8 is the object side surface of lens L4
9 is the image side surface of lens L4
10 is the object side surface of lens L5
11 is the image side surface of lens L5
12 is the object side surface of lens L6
13 is the image side surface of lens L6
14 is the object side surface of the optical filter
15 is the image side surface of the optical filter The following table shows aspherical surface coefficients in one embodiment.

Figure 2:
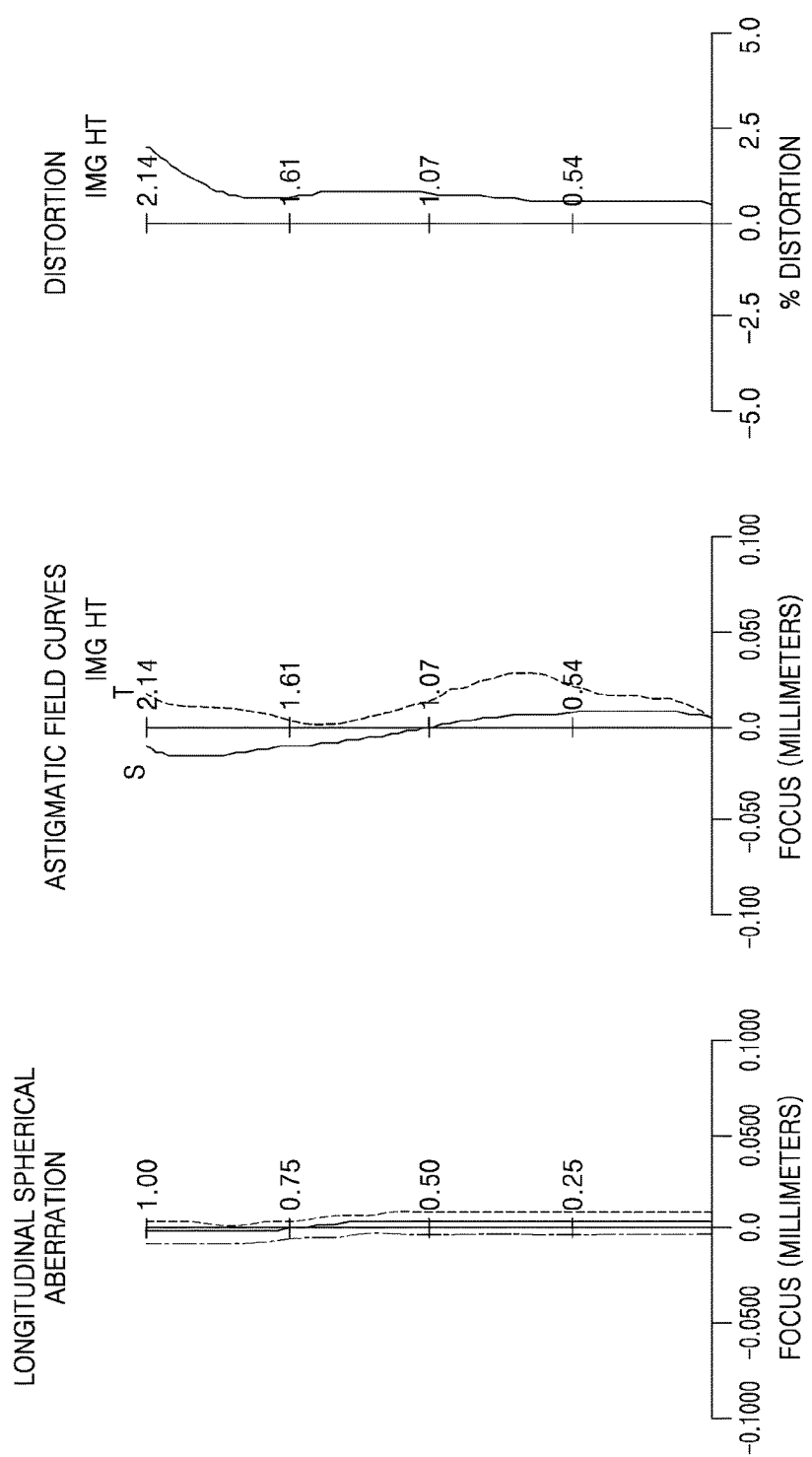
FIG. 2 illustrates aberration diagrams of a photographing lens system according to the embodiment of FIG. 1.

FIG. 2 shows longitudinal spherical aberration, astigmatic field curves, and distortion of the photographing lens system L according to the embodiment of FIG. 1. The astigmatic field curves are represented by a tangential field curvature T and a sagittal field curvature S.

Figure 3:
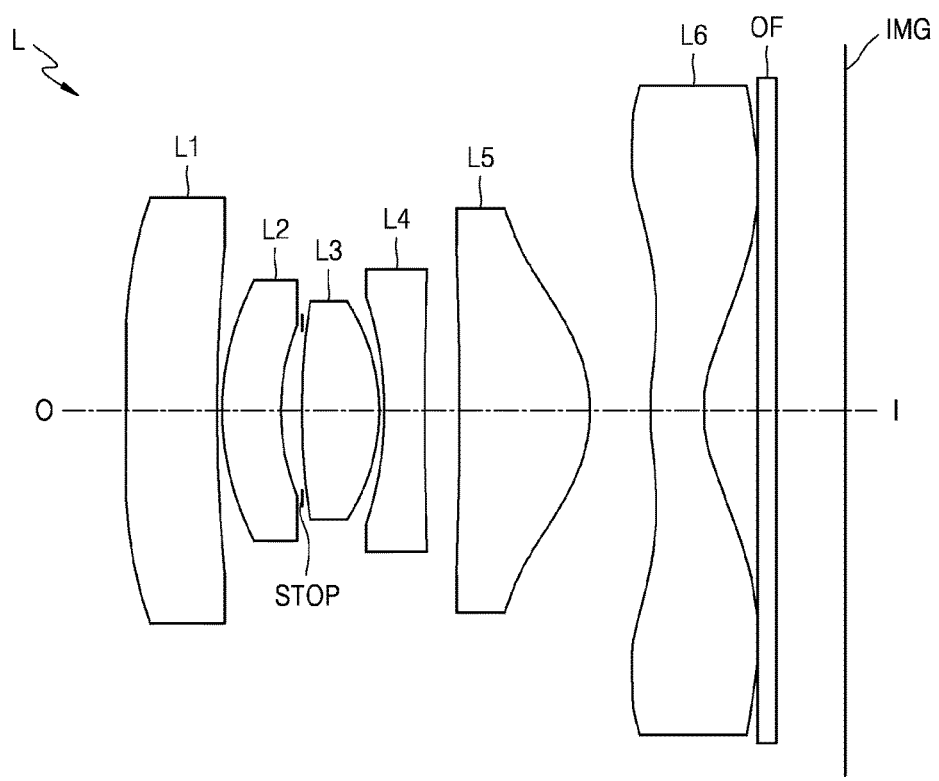
FIG. 3 illustrates a photographing lens according to another embodiment.

FIG. 3 illustrates a photographing lens system according to another embodiment. Design data of the embodiment of FIG. 3 are shown below.

EFL=2.12 mm; F-number=2.03; FOV=90 degrees

TABLE 3

| Lens Surface | R (mm) | Dn (mm) | Nd | Vd | Effective diameter (mm) |
|---|---|---|---|---|---|
| 1* | −18.891 | 0.540 | 1.540 | 55.9 | 2.5 |
| 2* | −13.074 | 0.030 | | | 1.9 |
| 3* | 1.388 | 0.342 | 1.636 | 23.9 | 1.5 |
| 4* | 1.358 | 0.135 | | | 1.0 |
| STOP | infinity | 0.004 | | | 0.9 |
| 6* | 9.789 | 0.449 | 1.545 | 56.1 | 1.0 |
| 7* | −1.592 | 0.030 | | | 1.3 |
| 8* | −4.736 | 0.242 | 1.640 | 23.5 | 1.4 |
| 9* | 4.510 | 0.210 | | | 1.7 |
| 10* | −26.303 | 0.767 | 1.545 | 56.1 | 2.0 |
| 11* | −0.818 | 0.364 | | | 2.4 |
| 12* | 2.191 | 0.305 | 1.553 | 42.6 | 3.5 |
| 13* | 0.677 | 0.322 | | | 4.0 |
| 14 | infinity | 0.110 | 1.517 | 64.2 | 4.0 |
| 15 | infinity | 0.330 | | | 4.1 |
| IMG | | 0.070 | | | 4.5 |

The following table shows aspherical surface coefficients in the embodiment of FIG. 3.

TABLE 2

| Lens Surface | R | K | A | B | C | D | E | F |
|---|---|---|---|---|---|---|---|---|
| 1* | −17.376 | −2.01E+26 | 8.86E−02 | −3.90E−02 | 1.35E−02 | −1.29E−03 | −1.40E−03 | 4.51E−04 |
| 2* | −12.658 | −1.33E+28 | 3.53E−03 | −7.12E−03 | 5.38E−03 | 1.67E−04 | −1.85E−03 | 9.77E−04 |
| 3* | 1.578 | −1.78E+00 | −1.67E−01 | −1.61E−01 | 2.81E−01 | −8.02E−02 | 1.29E−01 | −1.63E−01 |
| 4* | 1.601 | 4.32E+00 | −2.49E−01 | −5.04E−01 | 1.02E+00 | −1.06E+00 | −3.42E+00 | −8.51E−01 |
| 6* | −11.979 | 9.90E+01 | −8.15E−02 | −5.27E−01 | 1.15E+00 | −4.14E+00 | −1.14E−01 | 0.00E+00 |
| 7* | −0.965 | −3.97E+00 | −6.64E−02 | −1.21E+00 | 2.58E+00 | −2.49E+00 | −1.70E+00 | 1.74E+00 |
| 8* | −234.267 | 9.90E+01 | −2.65E−02 | −4.30E−01 | 9.76E−01 | −7.57E−01 | −2.22E−01 | 4.26E−01 |
| 9* | 2.202 | −3.77E+01 | −4.30E−02 | 1.48E−02 | 3.15E−02 | 4.28E−03 | −5.38E−03 | −6.53E−03 |
| 10* | −3.887 | 1.96E+00 | 9.89E−03 | 1.79E−03 | −4.16E−02 | 2.09E−01 | −1.37E−01 | 2.01E−02 |
| 11* | −0.759 | −6.50E−01 | 4.19E−01 | −3.40E−01 | 2.23E−01 | 1.10E−02 | −4.82E−02 | 2.77E−02 |
| 12* | 1.791 | −3.62E+01 | −1.51E−01 | 1.91E−02 | 8.08E−03 | 7.71E−04 | −6.72E−04 | 2.56E−05 |
| 13* | 0.589 | −4.22E+00 | −1.36E−01 | 7.47E−02 | −2.94E−02 | 5.70E−03 | −3.73E−04 | −7.96E−06 |

TABLE 4

| | | | | | | | | |
|---|---|---|---|---|---|---|---|---|
| 1* | −18.891 | −1.00E+10 | 1.30E−01 | −7.72E−02 | 2.41E−02 | 9.48E−05 | −4.45E−05 | −1.09E−03 |
| 2* | −13.074 | −1.00E+10 | 5.40E−02 | −6.52E−02 | 4.26E−02 | 7.63E−02 | −5.50E−02 | −7.25E−03 |
| 3* | 1.388 | 1.01E+00 | −3.09E−01 | −1.72E−01 | 7.81E−01 | −6.93E−01 | 7.38E−01 | 2.54E−08 |
| 4* | 1.358 | 5.07E+00 | −4.40E−01 | −8.32E−01 | 3.53E+00 | −8.63E+00 | −3.42E+00 | −8.51E−01 |
| 6* | 9.789 | −2.82E+01 | −8.85E−02 | 2.83E−01 | −4.22E+00 | 1.23E+01 | −1.14E−01 | 1.94E−10 |
| 7* | −1.592 | −1.04E+00 | −1.13E−01 | −1.08E+00 | 2.40E+00 | −3.18E+00 | −1.70E+00 | 1.74E+00 |
| 8* | −4.736 | 3.99E+01 | −2.65E−01 | −3.12E−01 | 1.52E+00 | −6.27E−01 | −2.12E−01 | 4.26E−01 |
| 9* | 4.510 | −9.71E+01 | −1.40E−01 | −2.57E−02 | 7.90E−02 | 7.04E−02 | 5.14E−02 | 3.40E−02 |
| 10* | −26.303 | −2.70E+01 | 2.56E−02 | 3.55E−02 | −1.29E−01 | 1.19E−01 | −7.33E−02 | 2.15E−02 |
| 11* | −0.818 | −7.47E−01 | 3.16E−01 | −2.57E−01 | 2.69E−01 | −8.21E−03 | −8.18E−02 | 2.16E−02 |
| 12* | 2.191 | −5.85E+01 | −1.86E−01 | 6.26E−02 | 3.17E−03 | −1.44E−03 | −7.97E−04 | 1.62E−04 |
| 13* | 0.677 | −4.58E+00 | −1.44E−01 | 8.05E−02 | −3.16E−02 | 6.37E−03 | −3.96E−04 | −1.78E−05 |

Figure 4:
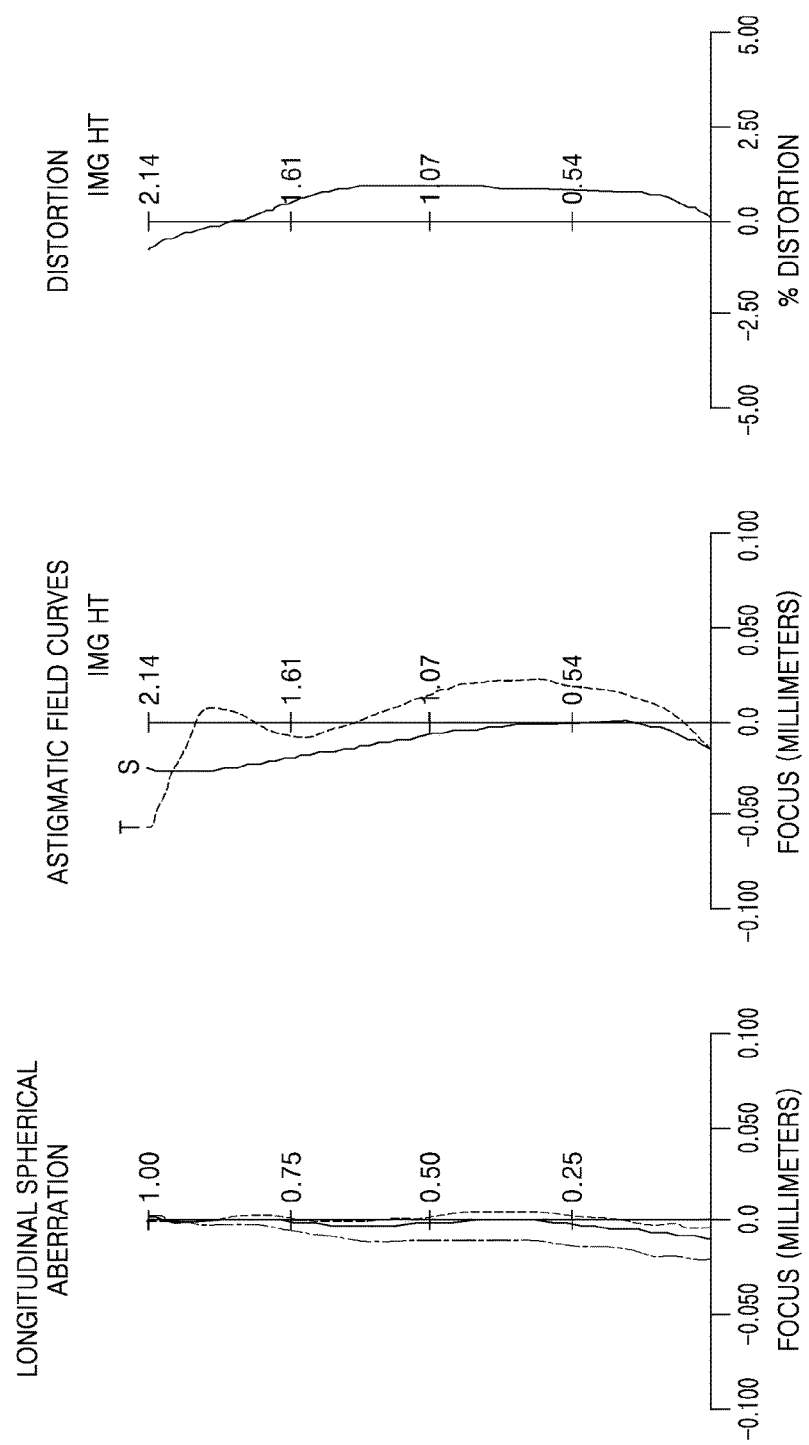
FIG. 4 illustrates aberration diagrams of a photographing lens system according to the embodiment of FIG. 3.

FIG. 4 shows longitudinal spherical aberration, astigmatic field curves, and distortion of the photographing lens system L according to the embodiment in FIG. 3.

Figure 5:
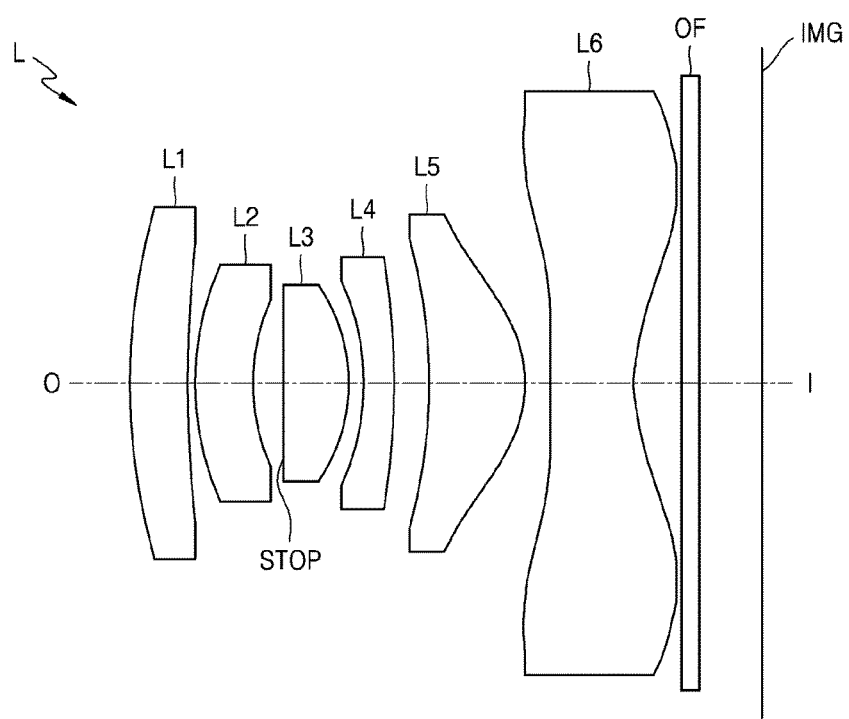
FIG. 5 illustrates a photographing lens according to another embodiment.

FIG. 5 illustrates a photographing lens system according to an embodiment. Design data of the embodiment of FIG. 5 are shown below.

EFL=2.09 mm, F-number=2.05, FOV=90 degrees

TABLE 5

| Lens Surface | R (mm) | Dn (mm) | Nd | Vd | Effective Diameter (mm) |
|---|---|---|---|---|---|
| 1* | −16.390 | 0.359 | 1.539 | 55.9 | 2.3 |
| 2* | −13.316 | 0.056 | | | 2.0 |
| 3* | 1.434 | 0.375 | 1.630 | 23.6 | 1.6 |
| 4* | 1.349 | 0.188 | | | 1.1 |
| STOP | infinity | −0.001 | | | 0.9 |
| 6* | 5.339 | 0.432 | 1.545 | 56.1 | 1.0 |
| 7* | −2.049 | 0.088 | | | 1.2 |
| 8* | −4.998 | 0.200 | 1.651 | 21.5 | 1.4 |
| 9* | 14.945 | 0.224 | | | 1.6 |
| 10* | −6.532 | 0.608 | 1.545 | 56.1 | 1.9 |
| 11* | −0.718 | 0.162 | | | 2.1 |
| 12* | 10.812 | 0.544 | 1.535 | 55.8 | 3.0 |
| 13* | 0.806 | 0.301 | | | 3.7 |
| 14 | infinity | 0.110 | 1.517 | 64.2 | 3.9 |
| 15 | infinity | 0.345 | | | 3.9 |
| IMG | | 0.059 | | | 4.3 |

The following table shows aspherical surface coefficients in the embodiment of FIG. 5.

TABLE 6

| | | | | | | | | |
|---|---|---|---|---|---|---|---|---|
| 1* | −16.390 | −2.45E+03 | 1.83E−01 | −9.63E−02 | 4.66E−02 | −6.13E−03 | −2.87E−03 | −1.75E−03 |
| 2* | −13.316 | −3.73E+03 | 1.64E−01 | −1.23E−01 | 2.35E−02 | 9.86E−02 | −1.40E−01 | 5.59E−02 |
| 3* | 1.434 | 1.50E+00 | −2.08E−01 | −4.61E−01 | 9.87E−01 | −1.04E+00 | 4.10E−01 | 1.35E−01 |
| 4* | 1.349 | 4.46E+00 | −4.31E−01 | −3.73E−01 | 1.04E+00 | −2.78E+00 | −3.42E+00 | −8.51E−01 |
| 6* | 5.339 | −1.71E+01 | −1.48E−01 | 2.24E−01 | −3.01E+00 | 5.90E+00 | −1.14E−01 | −7.77E−10 |
| 7* | −2.049 | 7.76E+00 | −5.19E−01 | −1.47E−02 | 1.04E+00 | −7.68E−01 | −1.70E+00 | 1.74E+00 |
| 8* | −4.998 | 3.95E+01 | −8.06E−01 | 1.65E−01 | 2.68E+00 | −2.50E+00 | −2.12E−01 | 4.26E−01 |
| 9* | 14.945 | −4.67E+02 | −4.14E−01 | 3.05E−01 | 3.02E−01 | 1.47E−01 | 1.05E−01 | 2.20E−01 |
| 10* | −6.532 | −5.01E+01 | −4.99E−02 | −6.61E−02 | 8.50E−03 | 1.47E−01 | −2.37E−01 | 9.22E−02 |
| 11* | −0.718 | −7.73E−01 | 4.43E−01 | −4.35E−01 | 3.46E−01 | 2.59E−02 | −6.03E−02 | −5.04E−03 |
| 12* | 10.812 | −2.32E+05 | −1.52E−01 | 6.99E−02 | −5.13E−03 | −6.54E−04 | −4.49E−04 | 9.96E−05 |
| 13* | 0.806 | −5.77E+00 | −1.20E−01 | 6.74E−02 | −2.91E−02 | 6.41E−03 | −5.68E−04 | 5.92E−06 |

Figure 6:
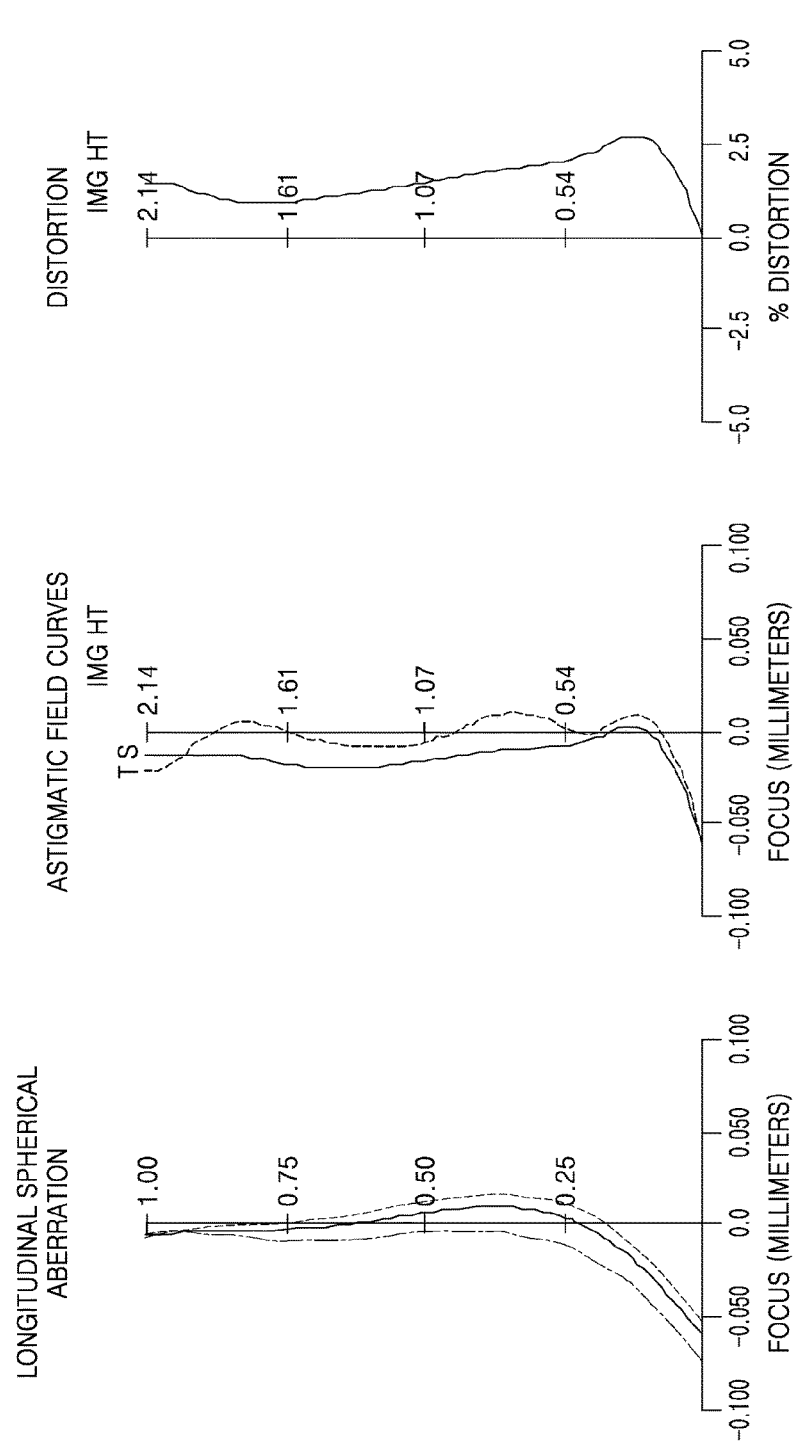
FIG. 6 illustrates aberration diagrams of a photographing lens system according to the embodiment of FIG. 5.

FIG. 6 shows longitudinal spherical aberration, astigmatic field curves, and distortion of a photographing lens system according to the embodiment of FIG. 5.

Figure 7:
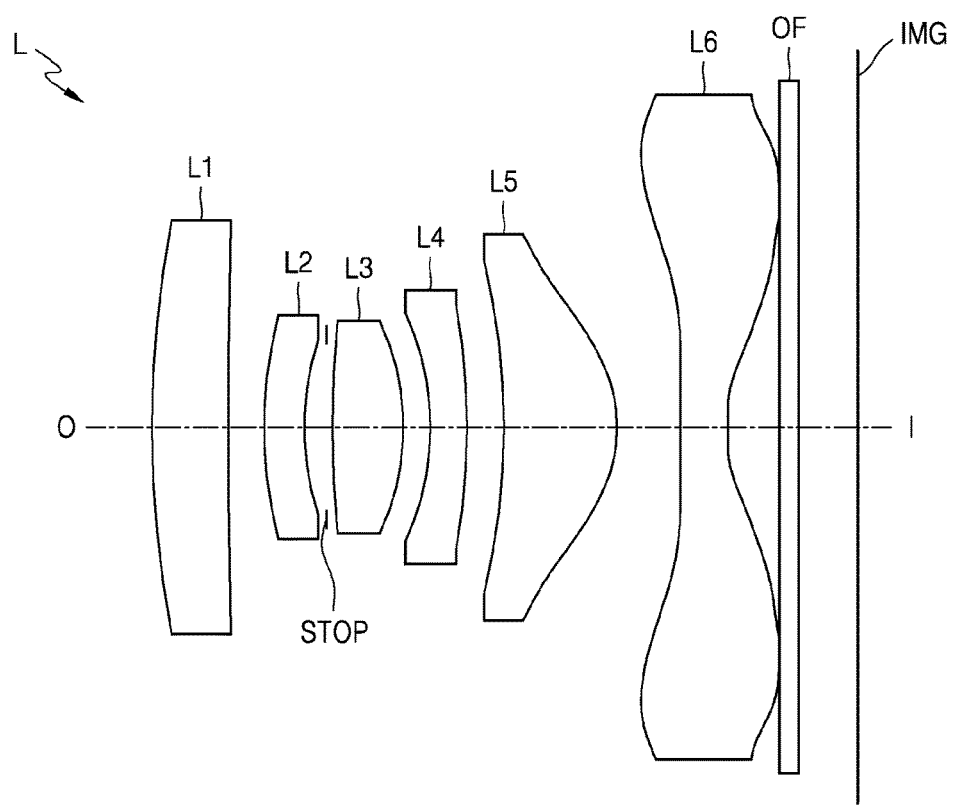
FIG. 7 illustrates a photographing lens according to another embodiment.

FIG. 7 illustrates a photographing lens system according to another embodiment. Design data of the embodiment of FIG. 7 are shown below.

EFL=2.08 mm; F-number=2.05; FOV=90 degrees

TABLE 7

| Lens Surface | R (mm) | Dn (mm) | Nd | Vd | Effective Diameter (mm) |
|---|---|---|---|---|---|
| 1* | −20.200 | 0.442 | 1.545 | 56.1 | 2.5 |
| 2* | −5.575 | 0.200 | | | 2.1 |
| 3* | 1.700 | 0.229 | 1.651 | 21.5 | 1.3 |
| 4* | 1.467 | 0.125 | | | 1.0 |
| STOP | infinity | 0.028 | | | 1.0 |
| 6* | 4.897 | 0.415 | 1.545 | 56.1 | 1.1 |
| 7* | −1.673 | 0.160 | | | 1.3 |
| 8* | −1.912 | 0.200 | 1.651 | 21.5 | 1.4 |
| 9* | −10.203 | 0.207 | | | 1.6 |
| 10* | −6.754 | 0.652 | 1.545 | 56.1 | 1.9 |
| 11* | −0.705 | 0.368 | | | 2.2 |
| 12* | 5.267 | 0.271 | 1.535 | 55.8 | 3.8 |
| 13* | 0.698 | 0.293 | | | 3.8 |
| 14 | infinity | 0.110 | 1.517 | 64.2 | 3.9 |
| 15 | infinity | 0.303 | | | 4.0 |
| IMG | | 0.047 | | | 4.3 |

The following table shows aspherical surface coefficients in the embodiment of FIG. 7.

TABLE 8

| Lens Surface | R | K | A | B | C | D | E | F |
|---|---|---|---|---|---|---|---|---|
| 1* | −20.200 | 1.66E+01 | 1.45E−01 | −7.85E−02 | 3.66E−02 | −1.07E−02 | −2.44E−03 | 6.93E−04 |
| 2* | −5.575 | −2.43E+02 | 1.64E−01 | −1.38E−01 | −4.79E−03 | 9.93E−02 | −1.07E−01 | 3.92E−02 |
| 3* | 1.700 | 6.24E−01 | −7.68E−02 | −7.73E−01 | 1.12E+00 | −8.05E−01 | 8.45E−01 | 1.35E−01 |
| 4* | 1.467 | 5.14E+00 | −3.69E−01 | −9.75E−01 | 1.75E+00 | −2.36E+00 | −3.42E+00 | −8.51E−01 |
| 6* | 4.897 | 3.96E+01 | −6.59E−02 | 2.28E−02 | −1.20E+00 | 4.22E+00 | −1.14E−01 | 2.08E−08 |
| 7* | −1.673 | 1.43E+00 | 6.60E−03 | −4.82E−01 | −6.75E−02 | 1.47E+00 | −1.70E+00 | 1.74E+00 |
| 8* | −1.912 | 5.66E+00 | 5.50E−02 | −7.87E−01 | 1.19E+00 | 1.19E+00 | −2.12E−01 | 4.26E−01 |
| 9* | −10.203 | 1.37E+02 | 0.00E+00 | −4.73E−01 | 7.29E−01 | −5.93E−01 | 7.19E−01 | −1.37E−01 |
| 10* | −6.754 | −3.46E+01 | −2.98E−02 | 4.14E−02 | −1.33E−01 | 9.11E−02 | −5.89E−02 | 3.84E−02 |
| 11* | −0.705 | −8.34E−01 | 4.42E−01 | −4.92E−01 | 4.75E−01 | −4.54E−02 | −1.23E−01 | 3.75E−02 |
| 12* | 5.267 | −7.16E+03 | −1.68E−01 | 7.06E−02 | −6.46E−03 | −2.34E−04 | −1.68E−04 | 3.97E−05 |
| 13* | 0.698 | −5.43E+00 | −1.21E−01 | 6.60E−02 | −2.87E−02 | 6.71E−03 | −8.01E−04 | 4.93E−05 |

Figure 8:
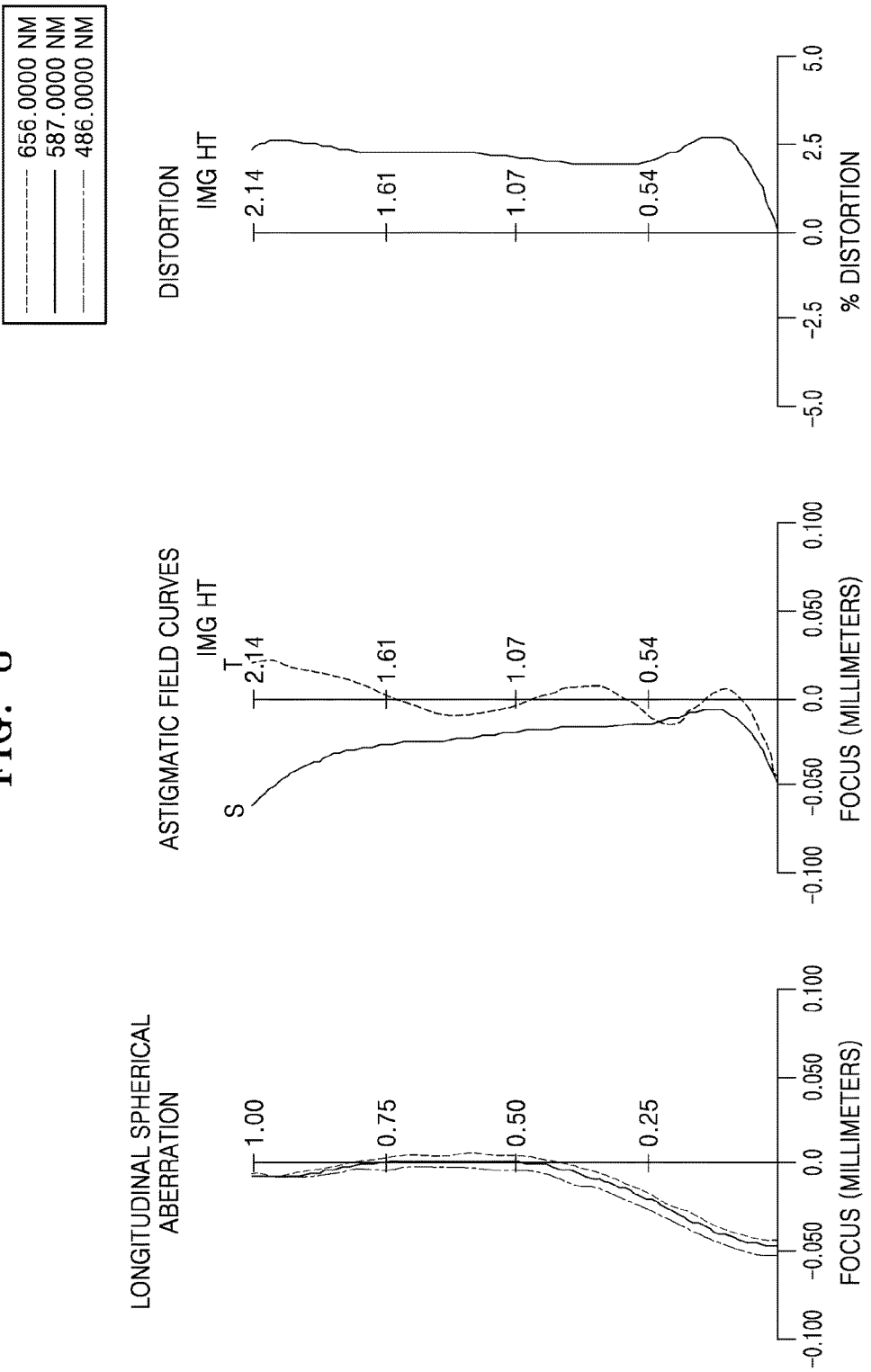
FIG. 8 illustrates aberration diagrams of a photographing lens system according to the embodiment of FIG. 7.

FIG. 8 shows longitudinal spherical aberration, astigmatic field curves, and distortion of a photographing lens system according to the embodiment of FIG. 7.

Figure 9:
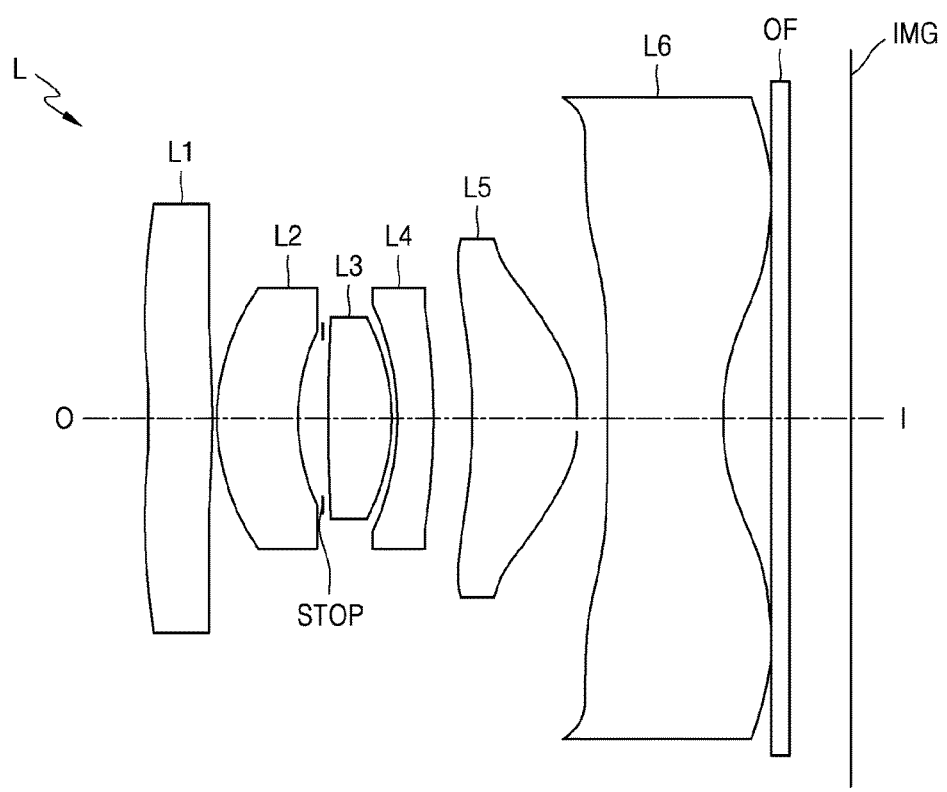
FIG. 9 illustrates a photographing lens according to another embodiment.

FIG. 9 illustrates a photographing lens system according to another embodiment. Design data of the embodiment of FIG. 9 are shown below.

EFL=2.07 mm; F-number=1.95; FOV=90 degrees

TABLE 9

| Lens Surface | R (mm) | Dn (mm) | Nd | Vd | Effective Diameter (mm) |
|---|---|---|---|---|---|
| 1* | −4.841 | 0.376 | 1.545 | 56.1 | 2.7 |
| 2* | −5.019 | 0.030 | | | 2.3 |
| 3* | 1.179 | 0.460 | 1.565 | 39.0 | 1.7 |
| 4* | 1.315 | 0.150 | | | 1.0 |
| STOP | infinity | 0.030 | | | 0.9 |
| 6* | 16.895 | 0.370 | 1.545 | 56.1 | 1.0 |
| 7* | −1.693 | 0.030 | | | 1.2 |
| 8* | −2.908 | 0.200 | 1.651 | 21.5 | 1.3 |
| 9* | −77.824 | 0.225 | | | 1.6 |
| 10* | −3.358 | 0.600 | 1.545 | 56.1 | 1.9 |
| 11* | −0.740 | 0.175 | | | 2.1 |
| 12* | 11.744 | 0.681 | 1.541 | 49.0 | 2.9 |
| 13* | 0.973 | 0.263 | | | 3.8 |
| 14 | infinity | 0.110 | 1.517 | 64.2 | 3.9 |
| 15 | infinity | 0.290 | | | 3.9 |
| IMG | | 0.065 | | | 4.4 |

The following table shows aspherical surface coefficients in the fifth numerical embodiment.

TABLE 10

| Lens Surface | R | K | A | B | C | D | E | F |
|---|---|---|---|---|---|---|---|---|
| 1* | −4.841 | −1.15E+02 | 1.35E−01 | −9.14E−02 | 3.16E−02 | −7.74E−03 | 8.34E−04 | 3.01E−04 |
| 2* | −5.019 | −2.69E+02 | 8.73E−02 | −1.12E−01 | 2.81E−03 | 1.10E−01 | −9.77E−02 | 2.95E−02 |
| 3* | 1.179 | 8.67E−01 | −1.12E−01 | −5.92E−01 | 9.22E−01 | −1.10E+00 | 7.34E−01 | −1.72E−01 |
| 4* | 1.315 | 4.69E+00 | −3.90E−01 | −3.57E−01 | 8.02E−01 | −6.67E+00 | −3.42E+00 | −8.51E−01 |
| 6* | 16.895 | 4.90E+01 | −4.07E−02 | −2.28E−01 | −1.37E+00 | 5.99E+00 | −1.14E−01 | 1.49E−08 |
| 7* | −1.693 | 1.67E+00 | −7.75E−02 | −1.43E+00 | −4.59E−01 | 6.58E+00 | −1.70E+00 | 1.74E+00 |
| 8* | −2.908 | 1.73E+01 | −1.65E−01 | −1.75E+00 | 2.17E+00 | 5.04E+00 | −1.80E+00 | 4.26E−01 |
| 9* | −77.824 | 0.00E+00 | −1.50E−01 | −5.62E−01 | 1.50E+00 | −1.48E+00 | 1.04E+00 | 1.27E−01 |
| 10* | −3.358 | 1.83E+00 | 3.69E−02 | 2.01E−02 | −8.52E−02 | 1.46E−01 | 4.14E−02 | −7.58E−02 |
| 11* | −0.740 | −8.01E−01 | 3.47E−01 | −3.97E−01 | 4.60E−01 | −5.57E−02 | −8.20E−02 | 1.72E−02 |
| 12* | 11.744 | −2.20E+06 | −7.93E−02 | 1.07E−02 | 9.09E−03 | 2.74E−04 | −8.33E−04 | 4.76E−05 |
| 13* | 0.973 | −6.25E+00 | −9.73E−02 | 6.18E−02 | −3.47E−02 | 1.07E−02 | −1.66E−03 | 1.04E−04 |

Figure 10:
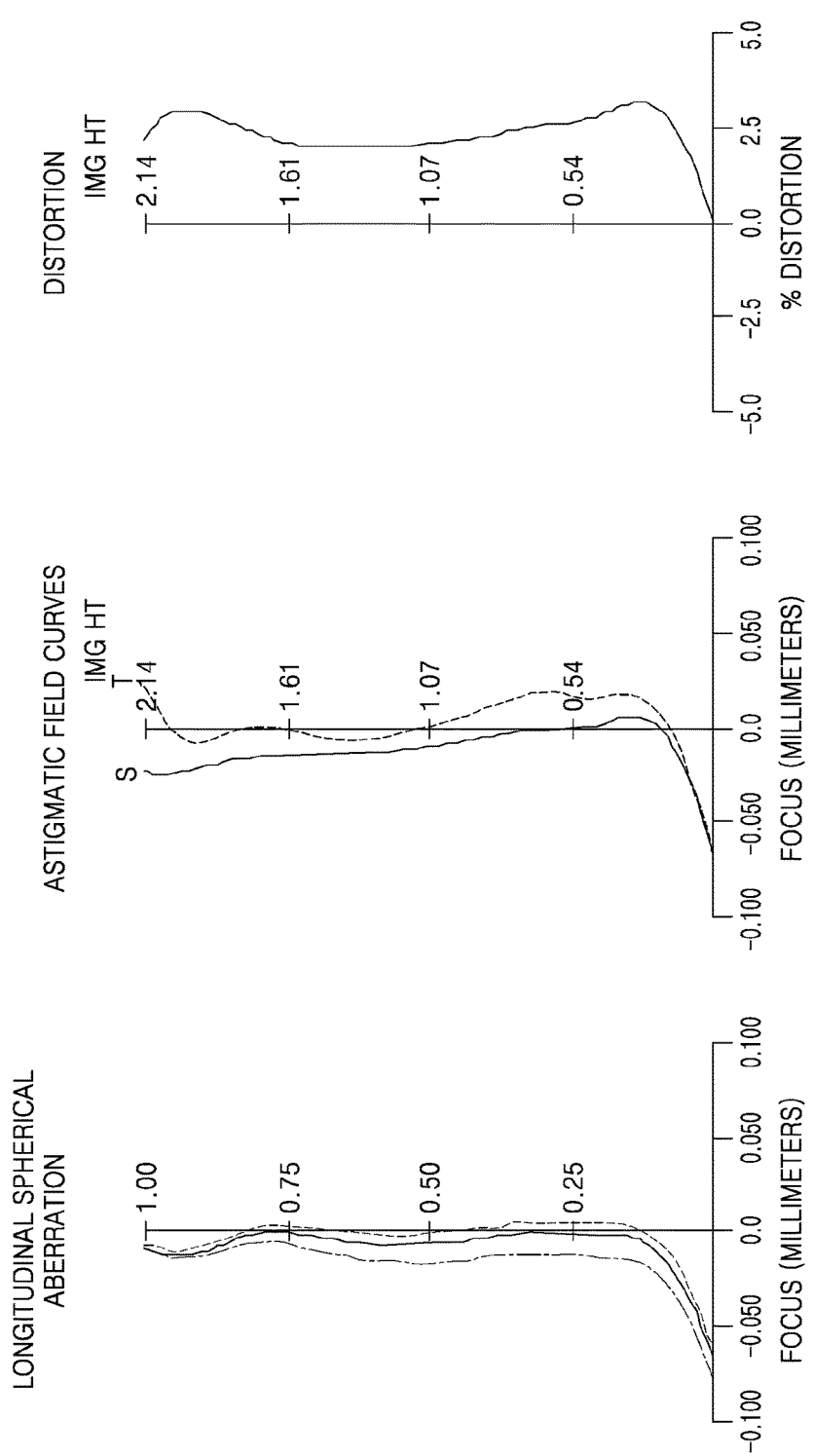
FIG. 10 illustrates aberration diagrams of a photographing lens system according to the embodiment of FIG. 9.

FIG. 10 shows longitudinal spherical aberration, astigmatic field curves, and distortion of a photographing lens system according to the embodiment of FIG. 9.

Figure 11:
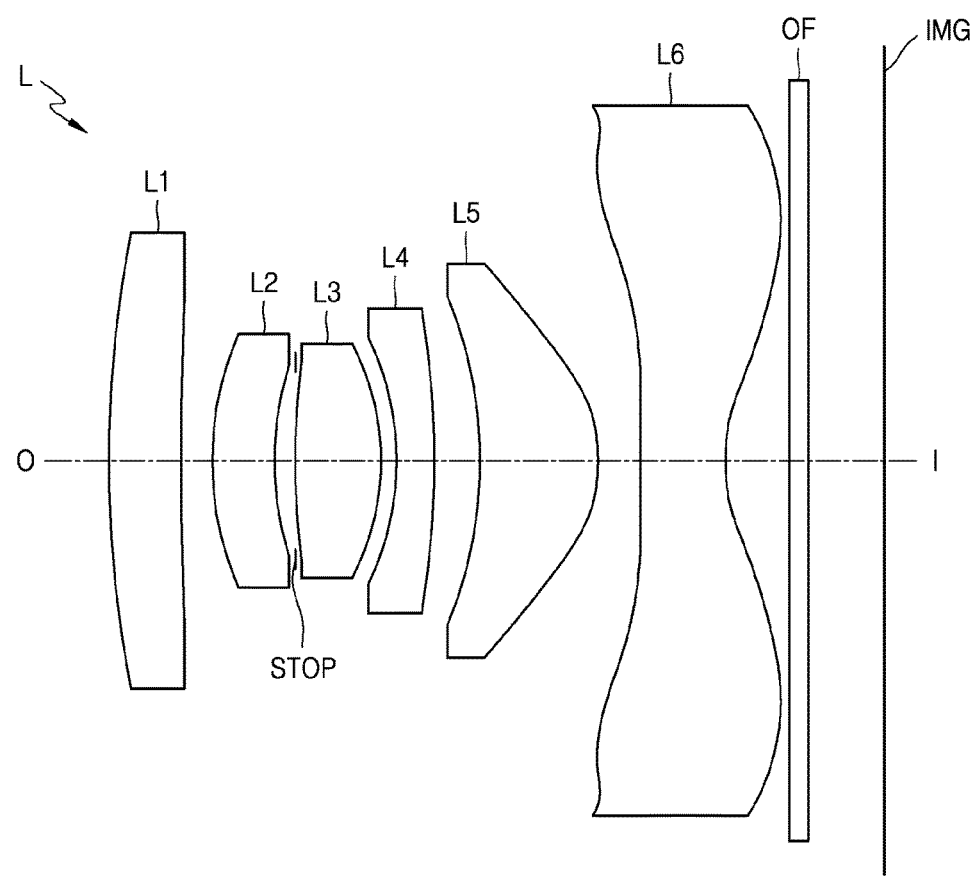
FIG. 11 illustrates a photographing lens according to another embodiment.

FIG. 11 illustrates a photographing lens system according to another embodiment. Design data of the embodiment of FIG. 11 are shown below.

EFL=2.07 mm; F-number=2.05; FOV=90 degrees

TABLE 11

| Lens Surface | R (mm) | Dn (mm) | Nd | Vd | Effective Diameter (mm) |
|---|---|---|---|---|---|
| 1* | −20.158 | 0.383 | 1.545 | 56.1 | 2.4 |
| 2* | −6.309 | 0.170 | | | 2.0 |
| 3* | 1.715 | 0.304 | 1.651 | 21.5 | 1.4 |
| 4* | 1.610 | 0.124 | | | 1.0 |
| STOP | infinity | −0.003 | | | 0.9 |
| 6* | 5.984 | 0.448 | 1.545 | 56.1 | 1.0 |
| 7* | −1.752 | 0.085 | | | 1.2 |
| 8* | −2.009 | 0.200 | 1.651 | 21.5 | 1.3 |
| 9* | −7.831 | 0.229 | | | 1.6 |
| 10* | −3.981 | 0.620 | 1.545 | 56.1 | 1.8 |
| 11* | −0.675 | 0.223 | | | 2.0 |
| 12* | 7.283 | 0.453 | 1.535 | 55.8 | 3.0 |
| 13* | 0.745 | 0.319 | | | 3.7 |
| 14 | infinity | 0.110 | 1.517 | 64.2 | 3.9 |
| 15 | infinity | 0.386 | | | 4.0 |
| IMG | | 0.000 | | | 4.3 |

The following table shows aspherical surface coefficients in the embodiment of FIG. 11.

TABLE 12

| lens surface | R | K | A | B | C | D | E | F |
|---|---|---|---|---|---|---|---|---|
| 1* | −20.158 | −5.72E+02 | 1.38E−01 | −8.40E−02 | 3.85E−02 | −9.54E−03 | −1.91E−03 | 1.07E−03 |
| 2* | −6.309 | −3.75E+02 | 1.41E−01 | −1.31E−01 | 1.40E−02 | 1.08E−01 | −1.11E−01 | 3.84E−02 |
| 3* | 1.715 | 1.88E+00 | −3.73E−02 | −5.74E−01 | 1.15E+00 | −9.89E−01 | 6.88E−01 | 1.35E−01 |
| 4* | 1.610 | 7.50E+00 | −2.92E−01 | −6.02E−01 | 1.38E+00 | −2.40E+00 | −3.42E+00 | −8.51E−01 |
| 6* | 5.984 | 9.90E+01 | −1.16E−01 | 2.36E−01 | −3.04E+00 | 1.05E+01 | −1.14E−01 | 2.08E−08 |
| 7* | −1.752 | 2.39E+00 | −4.24E−02 | −7.28E−01 | 7.92E−02 | 2.28E+00 | −1.70E+00 | 1.74E+00 |
| 8* | −2.009 | 7.21E+00 | 2.34E−02 | −9.52E−01 | 1.43E+00 | 2.14E+00 | −2.12E−01 | 4.26E−01 |
| 9* | −7.831 | 8.89E+01 | 0.00E+00 | −4.12E−01 | 6.97E−01 | −6.81E−01 | 7.65E−01 | −1.37E−01 |
| 10* | −3.981 | 1.29E+01 | −4.57E−03 | 1.06E−02 | −1.64E−01 | 1.05E−01 | −2.75E−02 | −1.06E−01 |
| 11* | −0.675 | −8.10E−01 | 4.29E−01 | −4.98E−01 | 4.29E−01 | −5.69E−02 | −9.97E−02 | 5.90E−02 |
| 12* | 7.283 | −1.90E+04 | −1.62E−01 | 6.12E−02 | −3.88E−03 | 3.27E−04 | −2.14E−04 | −1.71E−05 |
| 13* | 0.745 | −5.58E+00 | −1.28E−01 | 7.14E−02 | −3.06E−02 | 6.99E−03 | −7.91E−04 | 3.71E−05 |

Figure 12:
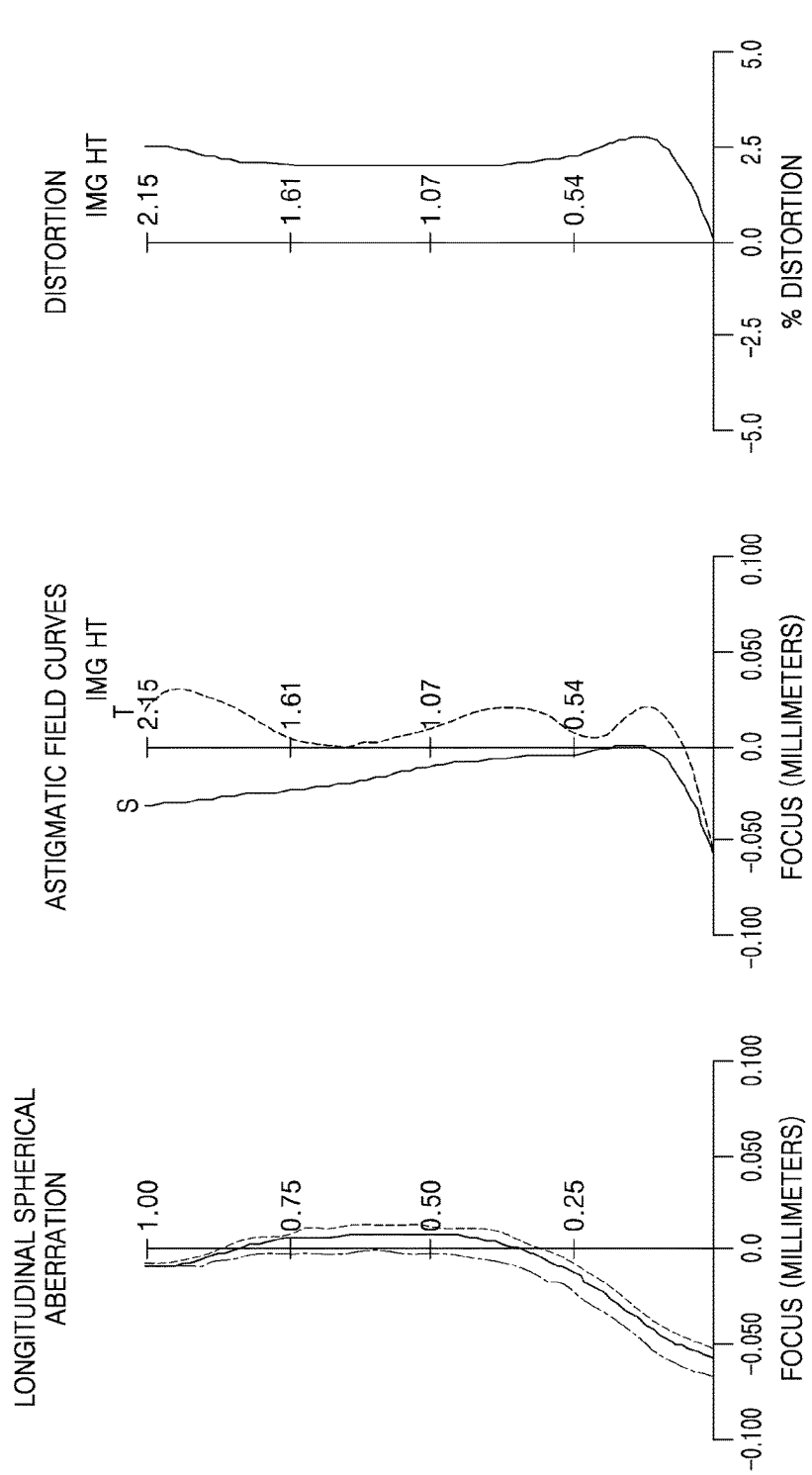
FIG. 12 illustrates aberration diagrams of a photographing lens system according to the embodiment of FIG. 11.

FIG. 12 shows longitudinal spherical aberration, astigmatic field curves, and distortion of a photographing lens system according to the embodiment of FIG. 12.

Figure 13:
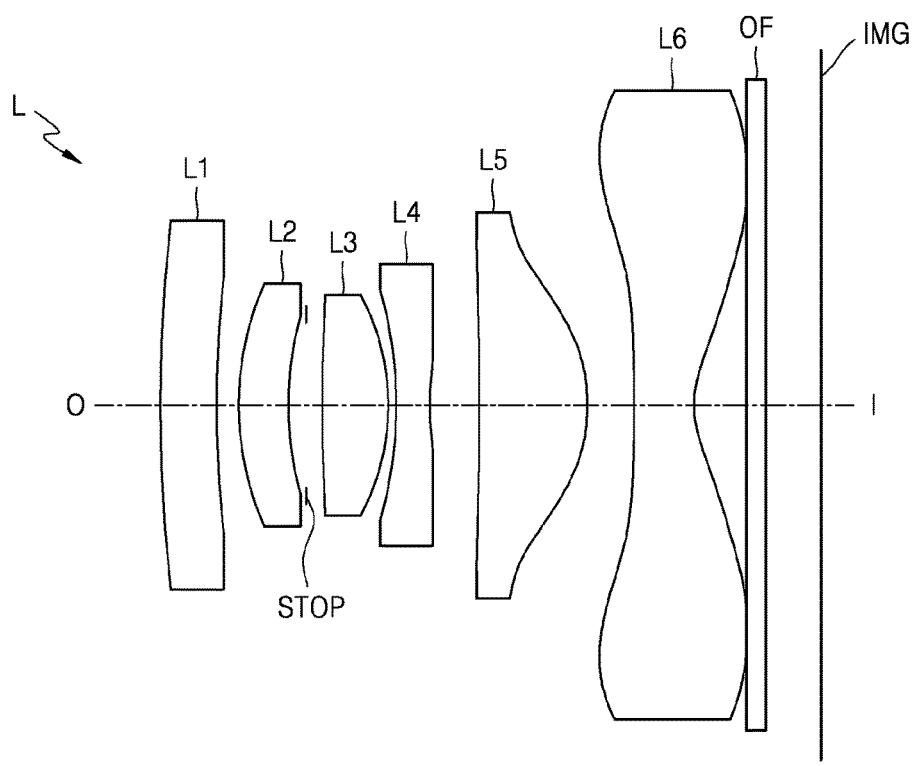
FIG. 13 illustrates a photographing lens according to another embodiment.

FIG. 13 illustrates a photographing lens system according to another embodiment. Design data of the embodiment of FIG. 13 are shown below.

EFL=2.07 mm; F-number=1.95 FOV=90 degrees

TABLE 13

| Lens Surface | R (mm) | Dn (mm) | Nd | Vd | Effective Diameter (mm) |
|---|---|---|---|---|---|
| 1* | −9.185 | 0.355 | 1.545 | 56.1 | 2.3 |
| 2* | −9.653 | 0.130 | | | 1.9 |
| 3* | 1.553 | 0.304 | 1.545 | 56.1 | 1.5 |
| 4* | 1.887 | 0.098 | | | 1.1 |
| STOP | infinity | 0.108 | | | 1.0 |
| 6* | 6.130 | 0.399 | 1.545 | 56.1 | 1.2 |
| 7* | −1.808 | 0.058 | | | 1.4 |
| 8* | −6.457 | 0.200 | 1.651 | 21.5 | 1.5 |
| 9* | 3.258 | 0.304 | | | 1.7 |
| 10* | 35.669 | 0.661 | 1.545 | 56.1 | 2.2 |
| 11* | −0.765 | 0.274 | | | 2.4 |
| 12* | 4.044 | 0.340 | 1.535 | 55.8 | 3.3 |
| 13* | 0.678 | 0.318 | | | 3.9 |
| 14 | infinity | 0.110 | 1.517 | 64.2 | 3.9 |
| 15 | infinity | 0.361 | | | 4.0 |
| IMG | | 0.000 | | | 4.3 |

The following table shows aspherical surface coefficients in the embodiment of FIG. 13.

Figure 14:
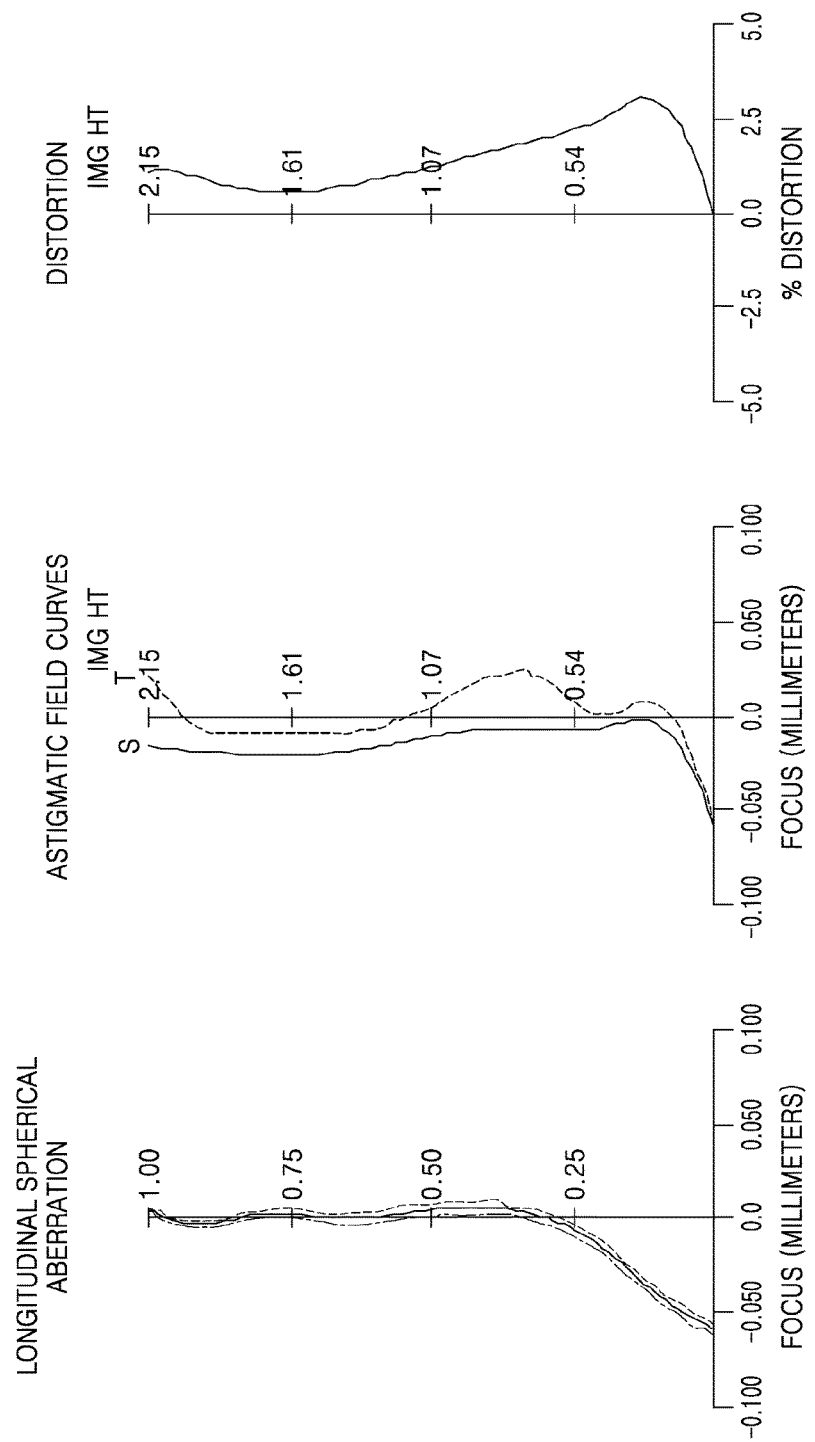
FIG. 14 illustrates aberration diagrams of a photographing lens system according to the embodiment of FIG. 13.

FIG. 14 shows longitudinal spherical aberration, astigmatic field curves, and distortion of a photographing lens system according to the embodiment of FIG. 13.

Figure 15:
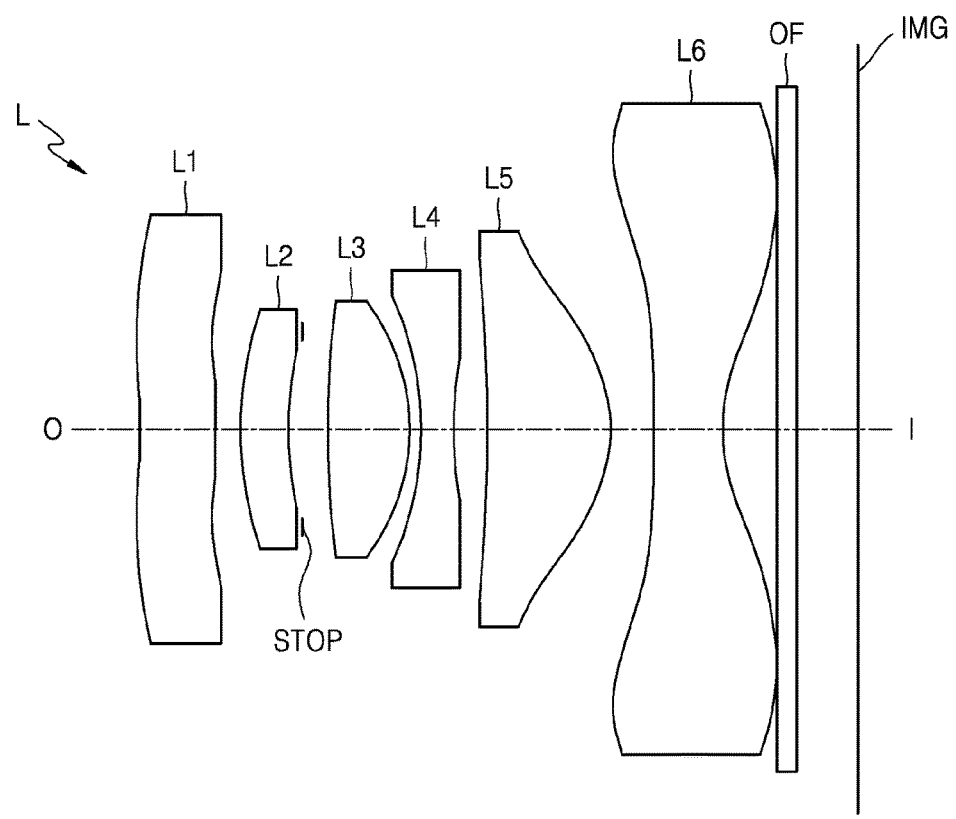
FIG. 15 illustrates a photographing lens according to another embodiment.

FIG. 15 illustrates a photographing lens system according to an eighth numerical embodiment. Design data of the embodiment of FIG. 15 are shown below.

EFL=1.91 mm; F-number=1.89 FOV=95 degrees

TABLE 15

| Lens Surface | R (mm) | Dn (mm) | Nd | Vd | Effective Diameter (mm) |
|---|---|---|---|---|---|
| 1* | −4.655 | 0.425 | 1.545 | 56.1 | 2.4 |
| 2* | −5.139 | 0.137 | | | 1.9 |
| 3* | 1.507 | 0.266 | 1.545 | 56.1 | 1.4 |
| 4* | 1.788 | 0.084 | | | 1.0 |
| STOP | infinity | 0.134 | | | 1.0 |
| 6* | 5.339 | 0.460 | 1.545 | 56.1 | 1.3 |
| 7* | −1.785 | 0.058 | | | 1.4 |
| 8* | −6.327 | 0.200 | 1.651 | 21.5 | 1.5 |
| 9* | 3.260 | 0.184 | | | 1.8 |
| 10* | 23.234 | 0.678 | 1.545 | 56.1 | 2.0 |
| 11* | −0.747 | 0.237 | | | 2.2 |
| 12* | 7.397 | 0.396 | 1.535 | 55.8 | 2.9 |
| 13* | 0.769 | 0.294 | | | 3.6 |
| 14 | infinity | 0.110 | 1.517 | 64.2 | 3.7 |
| 15 | infinity | 0.295 | | | 3.8 |
| IMG | | 0.058 | | | 4.3 |

The following table shows aspherical surface coefficients in the eighth numerical embodiment.

TABLE 14

| Lens Surface | R | K | A | B | C | D | E | F |
|---|---|---|---|---|---|---|---|---|
| 1* | −9.185 | −4.03E+02 | 1.43E−01 | −6.72E−02 | 2.65E−02 | −1.44E−02 | −3.19E−03 | 1.80E−04 |
| 2* | −9.653 | −1.25E+03 | 1.98E−01 | −1.22E−01 | −3.43E−02 | 6.65E−02 | −1.25E−01 | 8.46E−02 |
| 3* | 1.553 | 3.02E+00 | −1.64E−01 | −5.63E−01 | 4.92E−01 | −3.58E−01 | 6.61E−01 | −5.12E−01 |
| 4* | 1.887 | 9.30E+00 | −4.21E−01 | −6.86E−01 | 2.04E+00 | −3.54E+00 | −3.42E+00 | −8.51E−01 |
| 6* | 6.130 | −2.40E+01 | −1.39E−01 | −3.26E−01 | −9.89E−01 | 4.79E+00 | −1.14E−01 | 1.68E−08 |
| 7* | −1.808 | −3.18E+01 | −4.73E−01 | −4.54E−01 | 6.54E−01 | 1.17E+00 | −1.70E+00 | 1.74E+00 |
| 8* | −6.457 | 6.98E+01 | −5.48E−02 | −1.69E+00 | 4.36E+00 | −2.62E+00 | −6.61E−01 | 4.26E−01 |
| 9* | 3.258 | 0.00E+00 | −2.67E−01 | −1.21E−01 | 8.71E−01 | −1.34E+00 | 1.13E+00 | −4.29E−01 |
| 10* | 35.669 | 0.00E+00 | −1.82E−02 | 2.91E−03 | −4.27E−02 | 9.08E−02 | −7.67E−02 | 2.20E−02 |
| 11* | −0.765 | −8.05E−01 | 4.55E−01 | −4.33E−01 | 3.39E−01 | −3.89E−02 | −4.19E−02 | 7.39E−03 |
| 12* | 4.044 | −2.02E+03 | −1.46E−01 | 4.01E−02 | 8.31E−03 | −2.34E−03 | −6.06E−04 | 1.67E−04 |
| 13* | 0.678 | −5.23E+00 | −1.18E−01 | 6.60E−02 | −2.96E−02 | 7.81E−03 | −1.07E−03 | 6.13E−05 |

TABLE 16

| Lens Surface | R | K | A | B | C | D | E | F |
|---|---|---|---|---|---|---|---|---|
| 1* | −4.655 | −8.12E+01 | 1.38E−01 | −6.64E−02 | 3.08E−02 | −1.04E−02 | −9.79E−04 | 6.91E−04 |
| 2* | −5.139 | −2.92E+02 | 2.05E−01 | −1.33E−01 | −2.65E−02 | 8.93E−02 | −1.11E−01 | 6.43E−02 |
| 3* | 1.507 | 2.78E+00 | −1.34E−01 | −7.59E−01 | 3.88E−01 | −8.16E−02 | 6.61E−01 | −5.12E−01 |
| 4* | 1.788 | 8.49E+00 | −4.11E−01 | −6.98E−01 | 1.86E+00 | −4.65E+00 | −3.42E+00 | −8.51E−01 |
| 6* | 5.339 | 2.60E+01 | −1.14E−01 | −1.02E−01 | −1.23E+00 | 3.53E+00 | −1.14E−01 | 1.70E−08 |
| 7* | −1.785 | −3.04E+01 | −5.78E−01 | −3.72E−01 | 7.36E−01 | 4.81E−01 | −1.70E+00 | 1.74E+00 |
| 8* | −6.327 | 6.74E+01 | −1.59E−01 | −1.74E+00 | 4.32E+00 | −2.35E+00 | −6.61E−01 | 4.26E−01 |
| 9* | 3.260 | 0.00E+00 | −2.80E−01 | −1.33E−01 | 8.97E−01 | −1.33E+00 | 1.12E+00 | −3.86E−01 |
| 10* | 23.234 | −9.82E+01 | −6.88E−02 | 3.17E−02 | −6.88E−02 | 6.43E−02 | −7.76E−02 | 4.63E−02 |
| 11* | −0.747 | −7.65E−01 | 4.57E−01 | −4.63E−01 | 4.08E−01 | −7.57E−02 | −3.90E−02 | 1.04E−02 |
| 12* | 7.397 | −3.54E+04 | −1.50E−01 | 4.74E−02 | 5.49E−03 | −1.78E−03 | −5.54E−04 | 1.21E−04 |
| 13* | 0.769 | −5.23E+00 | −1.28E−01 | 7.58E−02 | −3.51E−02 | 9.47E−03 | −1.33E−03 | 7.85E−05 |

Figure 16:
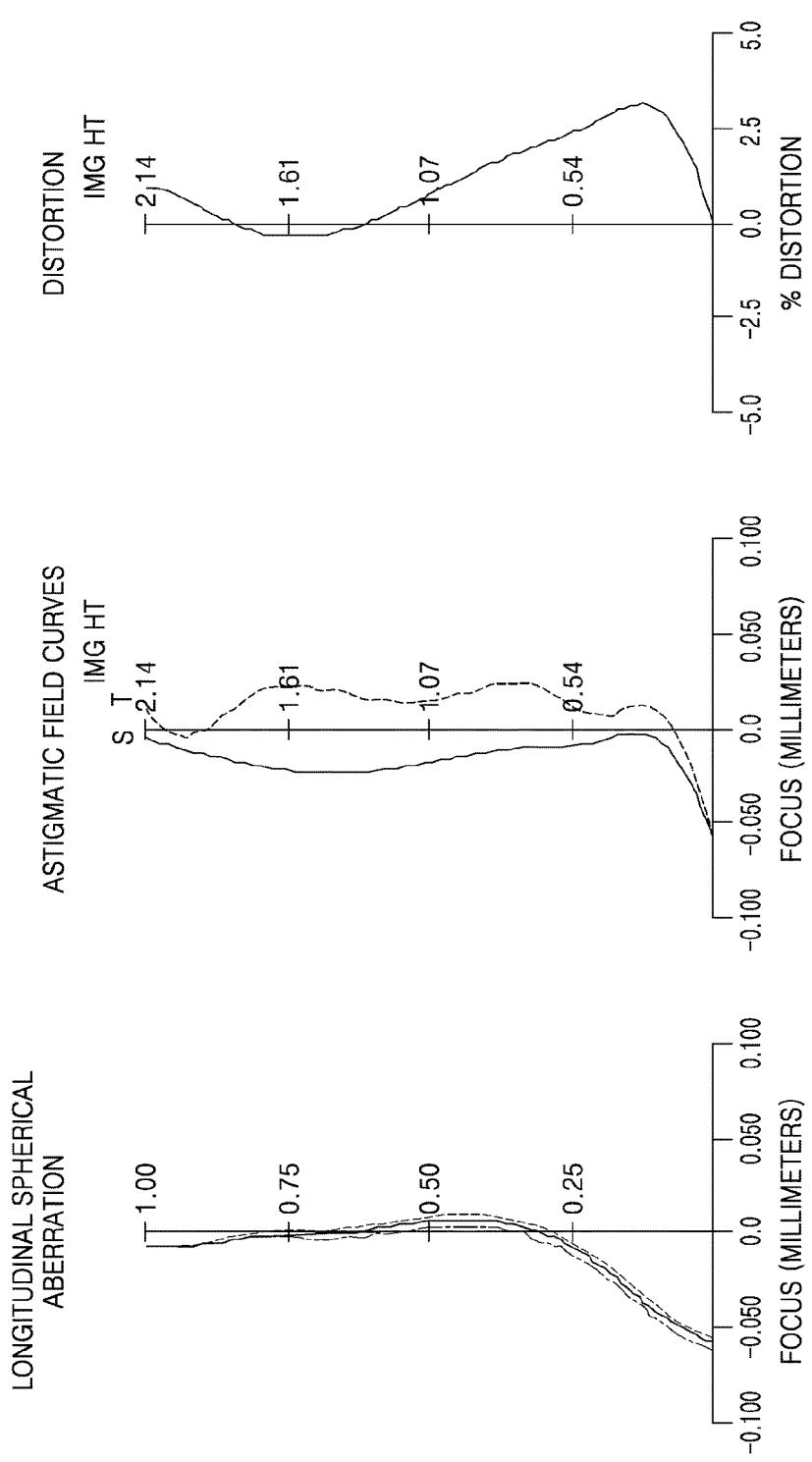
FIG. 16 illustrates aberration diagrams of a photographing lens system according to the embodiment of FIG. 15.

FIG. 16 shows longitudinal spherical aberration, astigmatic field curves, and distortion of a photographing lens system according to the embodiment of FIG. 15.

Figure 17:
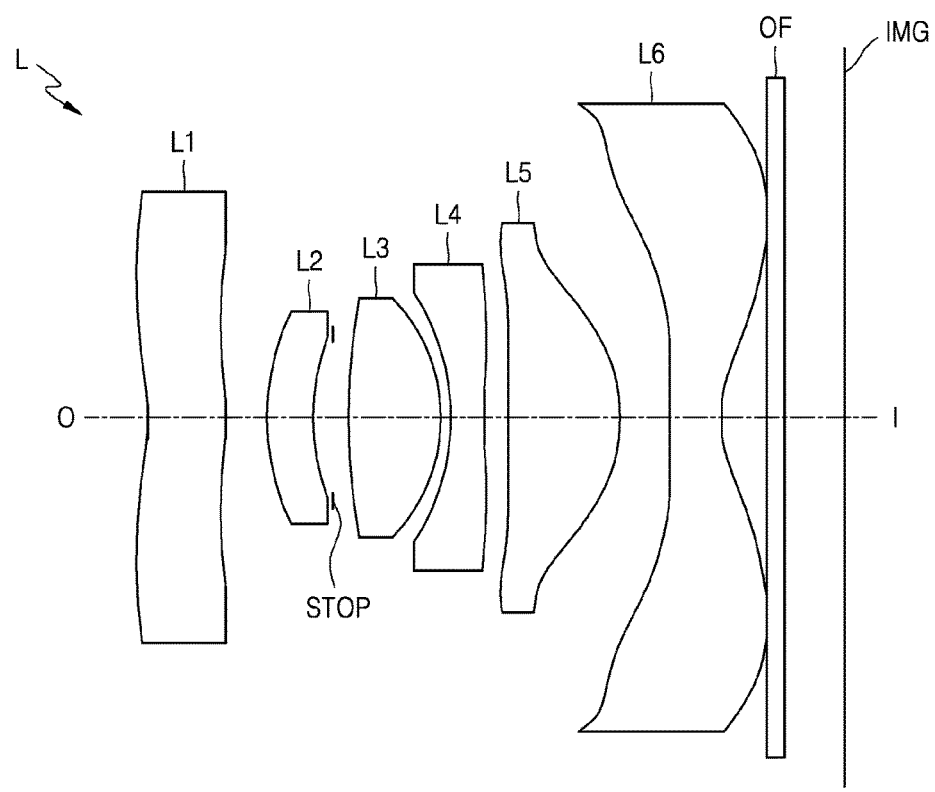
FIG. 17 illustrates a photographing lens according to another embodiment.

FIG. 17 illustrates a photographing lens system according to another embodiment. Design data of the embodiment of FIG. 17 are shown below.

EFL=1.76 mm; F-number=1.99; FOV=100 degrees

TABLE 17

| Lens Surface | R (mm) | Dn (mm) | Nd | Vd | Effective Diameter (mm) |
|---|---|---|---|---|---|
| 1* | −2.405 | 0.453 | 1.545 | 56.1 | 2.6 |
| 2* | −2.952 | 0.239 | | | 2.1 |
| 3* | 1.364 | 0.270 | 1.545 | 56.1 | 1.3 |
| 4* | 1.545 | 0.113 | | | 1.0 |
| STOP | infinity | 0.095 | | | 0.9 |
| 6* | 4.251 | 0.526 | 1.545 | 56.1 | 1.2 |
| 7* | −1.657 | 0.062 | | | 1.4 |
| 8* | −5.720 | 0.200 | 1.651 | 21.5 | 1.5 |
| 9* | 3.250 | 0.139 | | | 1.8 |
| 10* | 86.053 | 0.651 | 1.545 | 56.1 | 2.0 |
| 11* | −0.714 | 0.283 | | | 2.3 |
| 12* | 4.588 | 0.300 | 1.535 | 55.8 | 2.9 |
| 13* | 0.713 | 0.257 | | | 3.7 |
| 14 | infinity | 0.110 | 1.517 | 64.2 | 3.9 |
| 15 | infinity | 0.306 | | | 4.0 |
| IMG | | 0.044 | | | 4.3 |

The following table shows aspherical surface coefficients in the ninth numerical embodiment.

Figure 18:
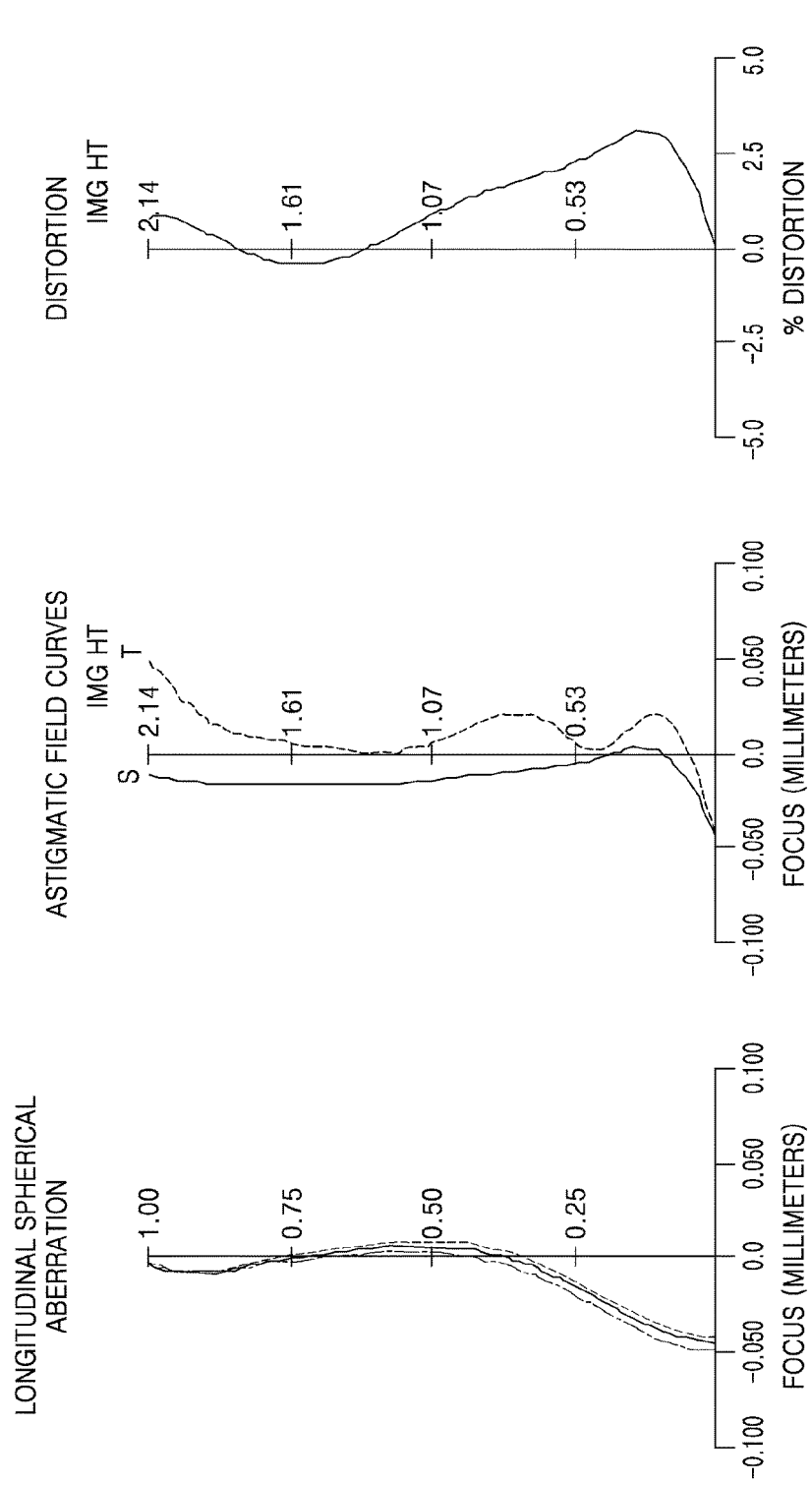
FIG. 18 illustrates aberration diagrams of a photographing lens system according to the embodiment of FIG. 17.

FIG. 18 shows longitudinal spherical aberration, astigmatic field curves, and distortion of a photographing lens system according to the embodiment of FIG. 17.

Tenth Numerical Embodiment

Figure 19:
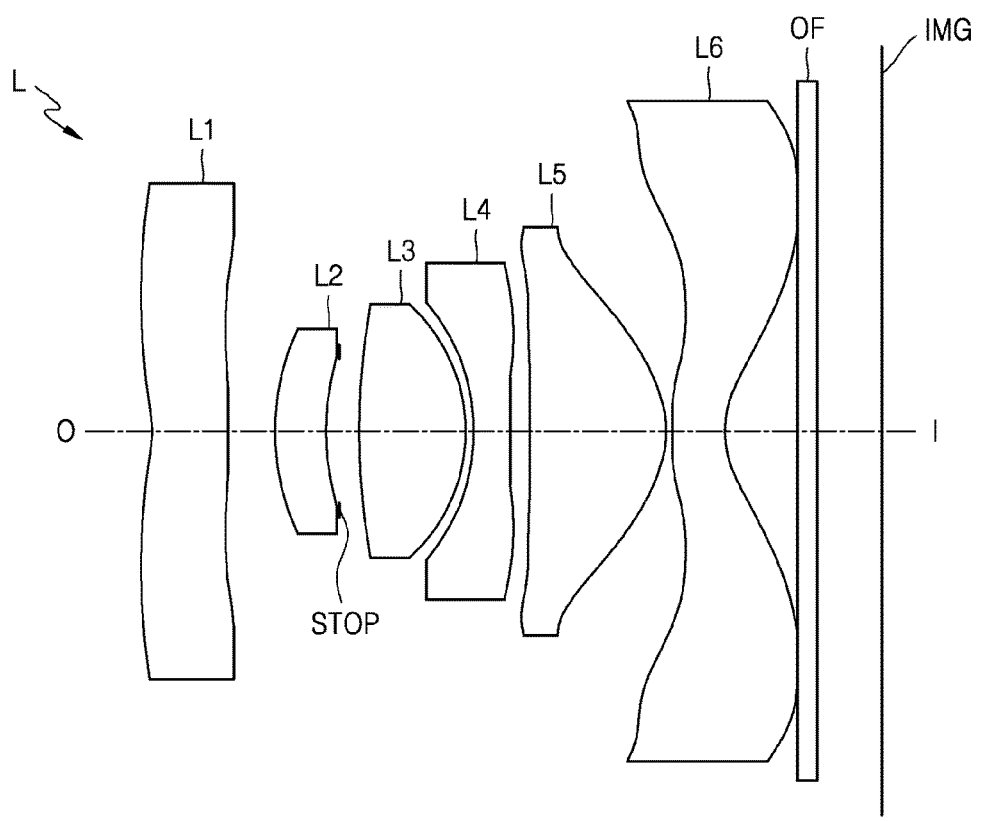
FIG. 19 illustrates a photographing lens according to another embodiment.

FIG. 19 illustrates a photographing lens system according to another embodiment. Design data of the embodiment of FIG. 19 are shown below.

EFL=1.58 mm; F-number=2.00; FOV=105 degrees

TABLE 19

| | | | | | |
|---|---|---|---|---|---|
| 1* | −2.206 | 0.427 | 1.545 | 56.1 | 3.0 |
| 2* | −3.222 | 0.261 | | | 2.2 |
| 3* | 1.360 | 0.275 | 1.545 | 56.1 | 1.2 |
| 4* | 1.667 | 0.083 | | | 0.9 |
| STOP | infinity | 0.111 | | | 0.8 |
| 6* | 4.272 | 0.579 | 1.545 | 56.1 | 1.2 |
| 7* | −1.606 | 0.048 | | | 1.4 |
| 8* | −5.534 | 0.200 | 1.651 | 21.5 | 1.5 |
| 9* | 3.030 | 0.107 | | | 1.9 |
| 10* | −183.644 | 0.759 | 1.545 | 56.1 | 2.1 |
| 11* | −0.655 | 0.030 | | | 2.2 |
| 12* | 0.905 | 0.303 | 1.535 | 55.8 | 3.0 |
| 13* | 0.417 | 0.406 | | | 3.7 |
| 14 | infinity | 0.110 | 1.517 | 64.2 | 3.9 |
| 15 | infinity | 0.311 | | | 3.9 |
| IMG | | 0.039 | | | 4.4 |

The following table shows aspherical surface coefficients in the tenth numerical embodiment.

TABLE 18

| Lens Surface | R | K | A | B | C | D | E | F |
|---|---|---|---|---|---|---|---|---|
| 1* | −2.405 | −2.33E+01 | 1.24E−01 | −7.42E−02 | 3.20E−02 | −8.17E−03 | −1.13E−04 | 4.34E−04 |
| 2* | −2.952 | −7.57E+01 | 1.98E−01 | −1.56E−01 | −1.45E−02 | 1.20E−01 | −9.90E−02 | 3.20E−02 |
| 3* | 1.364 | 2.59E+00 | 5.08E−02 | −1.05E+00 | 6.96E−01 | −1.04E+00 | 6.61E−01 | −5.12E−01 |
| 4* | 1.545 | 7.13E+00 | −1.47E−01 | −8.84E−01 | 1.20E+00 | −7.91E+00 | −3.42E+00 | −8.51E−01 |
| 6* | 4.251 | 2.58E+01 | −2.46E−02 | −1.58E−01 | −6.28E−01 | 1.38E+00 | −1.14E−01 | 1.70E−08 |
| 7* | −1.657 | −2.46E+01 | −7.73E−01 | −2.04E−01 | 8.66E−01 | −5.63E−01 | −1.70E+00 | 1.74E+00 |
| 8* | −5.720 | 5.67E+01 | −4.06E−01 | −1.72E+00 | 4.23E+00 | −2.13E+00 | −6.61E−01 | 4.26E−01 |
| 9* | 3.250 | 0.00E+00 | −3.22E−01 | −1.53E−01 | 9.05E−01 | −1.33E+00 | 1.11E+00 | −3.90E−01 |
| 10* | 86.053 | −9.90E+01 | −4.35E−02 | 4.20E−02 | −1.31E−01 | 8.53E−02 | −4.67E−02 | 3.59E−02 |
| 11* | −0.714 | −7.85E−01 | 4.52E−01 | −4.85E−01 | 4.56E−01 | −6.42E−02 | −4.43E−02 | 5.62E−03 |
| 12* | 4.588 | −4.79E+03 | −2.12E−01 | 5.60E−02 | 8.42E−03 | −1.36E−03 | −5.98E−04 | 2.10E−05 |
| 13* | 0.713 | −5.55E+00 | −1.35E−01 | 6.71E−02 | −3.19E−02 | 9.14E−03 | −1.31E−03 | 6.55E−05 |

TABLE 20

| Lens Surface | R | K | A | B | C | D | E | F |
|---|---|---|---|---|---|---|---|---|
| 1* | −2.206 | −2.62E+01 | 1.23E−01 | −7.38E−02 | 3.22E−02 | −7.95E−03 | −5.00E−05 | 3.64E−04 |
| 2* | −3.222 | −1.16E+02 | 2.05E−01 | −1.57E−01 | −1.45E−02 | 1.20E−01 | −9.88E−02 | 3.14E−02 |
| 3* | 1.360 | 2.72E+00 | 2.80E−02 | −1.10E+00 | 1.22E+00 | −2.15E+00 | 6.61E−01 | −5.12E−01 |
| 4* | 1.667 | 9.13E+00 | −1.17E−01 | −7.73E−01 | 2.00E−01 | −6.81E+00 | −3.42E+00 | −8.51E−01 |
| 6* | 4.272 | 1.95E+01 | 8.83E−03 | −1.45E−01 | −1.47E−01 | 3.39E−01 | 2.86E−01 | 2.56E−08 |
| 7* | −1.606 | −1.95E+01 | −7.78E−01 | −2.00E−01 | 8.29E−01 | −6.88E−01 | −1.65E+00 | 1.74E+00 |
| 8* | −5.534 | 5.33E+01 | −4.77E−01 | −1.73E−01 | 4.08E+00 | −2.29E+00 | −6.47E−01 | 5.16E−01 |
| 9* | 3.030 | 0.00E+00 | −3.19E−01 | −1.32E−01 | 8.77E−01 | −1.36E+00 | 1.11E+00 | −3.78E−01 |
| 10* | −183.644 | −9.90E+01 | −3.30E−03 | 2.00E−02 | −1.28E−01 | 1.06E−01 | −4.01E−02 | 1.73E−02 |
| 11* | −0.655 | −7.99E−01 | 4.78E−01 | −5.02E−01 | 4.50E−01 | −6.32E−02 | −4.04E−02 | 1.08E−02 |
| 12* | 0.905 | −1.42E+01 | −2.42E−01 | 5.27E−02 | 9.68E−03 | −1.12E−03 | −5.24E−04 | 1.43E−05 |
| 13* | 0.417 | −3.57E+00 | −1.75E−01 | 9.25E−02 | −3.76E−02 | 9.20E−03 | −1.22E−03 | 6.87E−05 |

Figure 20:
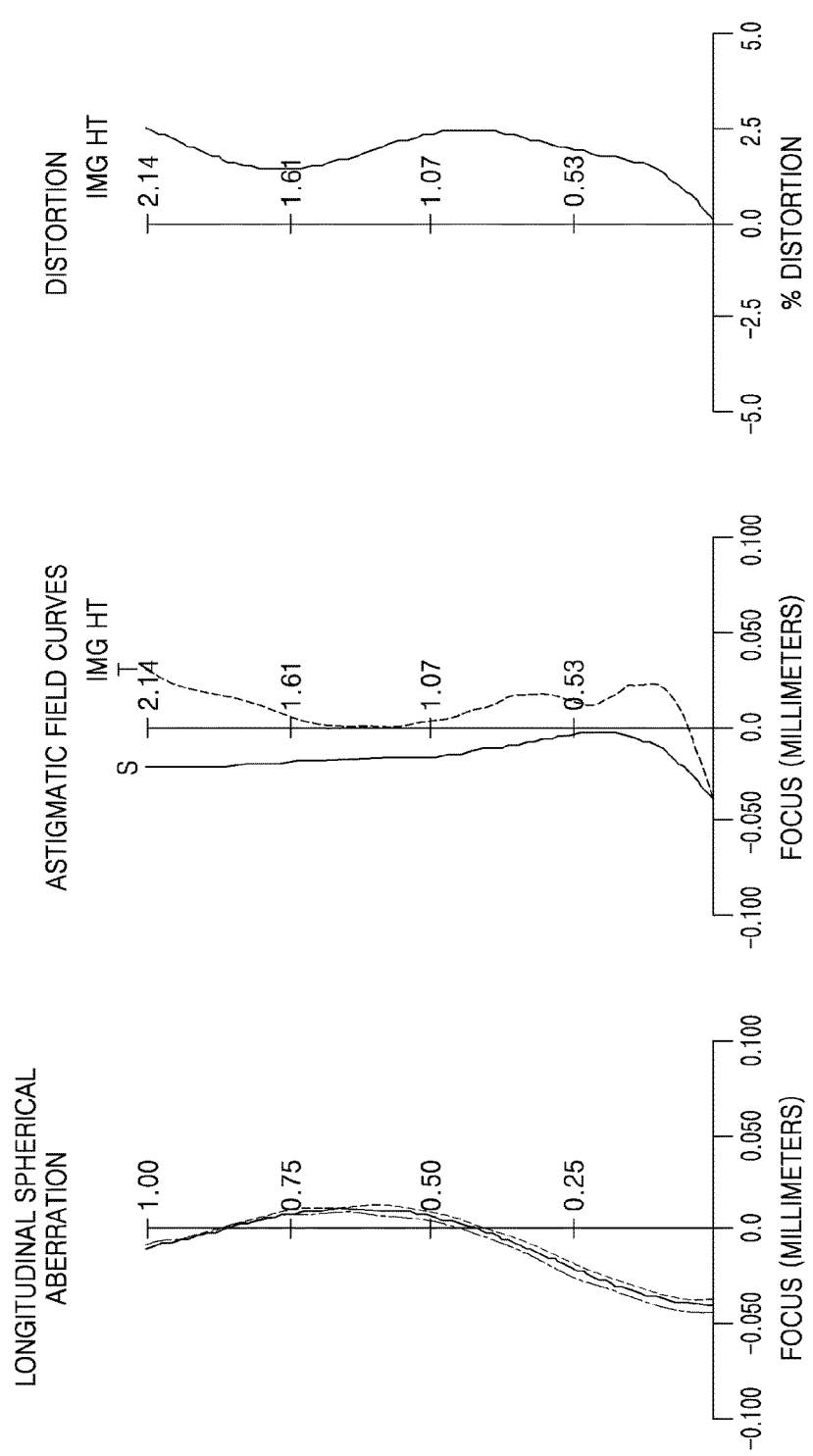
FIG. 20 illustrates aberration diagrams of a photographing lens system according to the embodiment of FIG. 19.

FIG. 20 shows longitudinal spherical aberration, astigmatic field curves, and distortion of a photographing lens system according to the embodiment of FIG. 20.

The following table shows that the photographing lens systems according to the embodiments of FIGS. 3, 5, 7, 9, 11, 13, 15, 17, and 19 satisfy Inequalities 1 to 10.

TABLE 21

| | FIG. 1 | FIG. 3 | FIG. 5 | FIG. 7 | FIG. 9 | FIG. 11 | FIG. 13 | FIG. 15 | FIG. 17 | FIG. 19 |
|---|---|---|---|---|---|---|---|---|---|---|
| |F1|/EFL | 39.5 | 35.7 | 60.5 | 6.7 | 484.2 | 8.1 | 226.7 | 68.9 | 19.1 | 9.5 |
| |F2|/EFL | 11.9 | 13.3 | 23.8 | 12.9 | 4.4 | 131.2 | 5.8 | 6.9 | 7.9 | 6.5 |
| F12/EFL | 0.11 | 0.11 | 0.06 | 0.08 | 0.23 | 0.14 | 0.17 | 0.13 | 0.08 | 0.06 |
| F3/EFL | 0.9 | 1.2 | 1.3 | 1.1 | 1.4 | 1.2 | 1.2 | 1.3 | 1.3 | 1.4 |
| T4/T3 | 0.4 | 0.5 | 0.5 | 0.5 | 0.5 | 0.4 | 0.5 | 0.4 | 0.4 | 0.3 |
| Vd4/Vd3 | 0.4 | 0.4 | 0.4 | 0.4 | 0.4 | 0.4 | 0.4 | 0.4 | 0.4 | 0.4 |
| |R51/R52| | 5.1 | 32.1 | 9.1 | 9.6 | 4.5 | 5.9 | 53.4 | 31.1 | 120.6 | 280.3 |
| EFL/EPD | 1.99 | 2.03 | 2.05 | 2.05 | 1.95 | 2.05 | 1.95 | 1.89 | 1.99 | 2.00 |
| FOV | 90 | 90 | 90 | 90 | 90 | 90 | 90 | 95 | 100 | 105 |
| IND-L4 | 1.651 | 1.640 | 1.651 | 1.651 | 1.651 | 1.651 | 1.651 | 1.651 | 1.651 | 1.651 |

The photographing lens system according to an embodiment may be applied to a photographing apparatus adopting an image sensor. The photographing lens system according to an embodiment is applicable to various photographing apparatuses such as digital cameras, interchangeable lens cameras, video cameras, mobile phone cameras, cameras for compact mobile devices.

Figure 21:
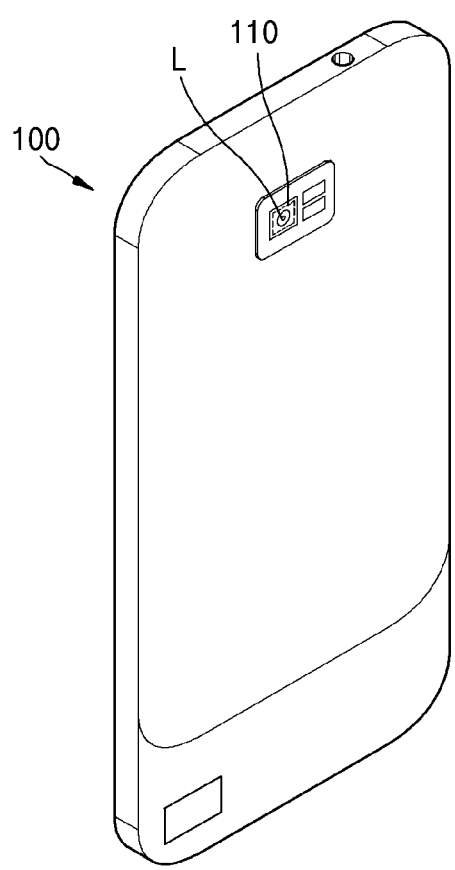
FIG. 21 illustrates a photographing apparatus having a photographing lens system according to an another embodiment.

FIG. 21 illustrates a photographing apparatus 100 with a photographing lens system according to an embodiment. Although FIG. 21 illustrates an example in which the photographing apparatus 100 is applied to a mobile phone, the present disclosure is not limited thereto. The photographing apparatus 100 may include the photographing lens system L and an image sensor 110 receiving an image formed by the photographing lens system L and converting the received image to an electric image signal. The photographing lens systems described with reference to FIGS. 1 to 20 may be employed as the photographing lens system L. As the photographing lens system according to an embodiment is applied to a photographing apparatus such as compact digital cameras or mobile phones, a photographing apparatus capable of photographing with a wide angle and high performance may be embodied.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A photographing lens system comprising:
a first lens having at least one inflection point, an object side surface that is concave in an area around an optical axis, and an image side surface that is convex toward an image side;
a second lens having a refractive power;
a third lens having a positive refractive power;
a fourth lens having a refractive power;
a fifth lens having a refractive power and an image side surface that is convex toward the image side, wherein at least one of an object side surface and the image side surface of the fifth lens is an aspherical surface; and
a sixth lens having a refractive power and an image side surface that is concave toward the image side, wherein at least one of an object side surface and the image side surface of the sixth lens is an aspherical surface,
wherein the first to sixth lenses are arranged in an order from an object side to the image side, and the photographing lens system satisfies an inequality that $$|F1|/EFL > 1,$$

where "F1" denotes a focal length of the first lens and "EFL" denotes a total focal length of the photographing lens system.

2. The photographing lens system of claim 1, wherein the first lens, the second lens, and the third lens define an aperture.

3. The photographing lens system of claim 2, wherein the aperture is provided between the second lens and the third lens.

4. The photographing lens system of claim 1, wherein:
the third lens has a diameter smaller than a diameter of the second lens; and
the photographing lens system further satisfying each of the following inequalities:

$|F2|/EFL>1$, $-0.25<EFL/F12<0.25$, $0<F3/EFL<5$, where "F2" denotes a focal length of the second lens, "F12" denotes a synthetic focal length of the first and second lenses, and "F3" denotes a focal length of the third lens.

5. The photographing lens system of claim 1, satisfying an inequality that $|F2|/EFL>1$, wherein "F2" denotes a focal length of the second lens and "EFL" denotes a total focal length of the photographing lens system.

6. The photographing lens system of claim 1, satisfying an inequality that $0<F3/EFL<5$, wherein "F3" denotes a focal length of the third lens and "EFL" denotes a total focal length of the photographing lens system.

7. The photographing lens system of claim 1, wherein the fourth lens comprises an object side surface that is concave toward the object side.

8. The photographing lens system of claim 1, satisfying an inequality that $0.1<T4/T3<1$, wherein "T4" denotes a central thickness of the fourth lens and "T3" denotes a central thickness of the third lens.

9. The photographing lens system of claim 1, satisfying an inequality that $Vd4/Vd3<1$, wherein "Vd4" denotes an Abbe number of the fourth lens and "Vd3" denotes an Abbe number of the third lens.

10. The photographing lens system of claim 1, satisfying an inequality that $|R51/R52|>1$, wherein "R51" denotes a radius of curvature of the object side surface of the fifth lens and "R52" denotes a radius of curvature of the image side surface of the fifth lens.

11. The photographing lens system of claim 1, wherein the object side surface of the sixth lens is convex toward the object side.

12. The photographing lens system of claim 1, wherein the sixth lens has at least one inflection point on the image side surface.

13. The photographing lens system of claim 1, wherein each of the first to sixth lenses has at least one aspherical surface.

14. The photographing lens system of claim 1, wherein each of the first to sixth lenses includes a plastic lens.

15. The photographing lens system of claim 1, satisfying an inequality that $IND\text{-}L4>1.6$, wherein "IND-L4" denotes a refractive index of the fourth lens.

16. The photographing lens system of claim 1, satisfying an inequality that $80<FOV<160$ (degrees), wherein "FOV" denotes an angle of view.

17. A photographing lens system comprising:
a first lens having a meniscus shape that is concave toward an object side in an area around an optical axis;
a second lens having a refractive power;
a third lens having a positive refractive power;
a fourth lens having a refractive power;
a fifth lens having a positive refractive power and an image side surface that is convex toward an image side, wherein at least one of an object side surface and the image side surface of the fifth lens is an aspherical surface; and
a sixth lens having a refractive power and an image side surface that is concave toward the image side, wherein at least one of an object side surface and the image side surface of the sixth lens is an aspherical surface,
wherein the first to sixth lenses are arranged in an order from the object side to the image side, and the photographing lens system satisfies an inequality that $|F1|/EFL>1$, where "F1" denotes a focal length of the first lens and "EFL" denotes a total focal length of the photographing lens system.

18. The photographing lens system of claim 17, wherein the first lens, the second lens, and the third lens define an aperture.

19. The photographing lens system of claim 18, wherein the aperture is provided between the second lens and the third lens.

20. The photographing lens system of claim 17, wherein the third lens has a diameter smaller than a diameter of the second lens.

21. The photographing lens system of claim 17, satisfying an inequality that $|F2|/EFL>1$, wherein "F2" denotes a focal length of the second lens and "EFL" denotes a total focal length of the photographing lens system.

22. A photographing lens system comprising:
a first lens having a meniscus shape that is concave toward an object side in an area around an optical axis;
a second lens having a refractive power;
a third lens having a positive refractive power;
a fourth lens having a refractive power;
a fifth lens having a positive refractive power and an image side surface that is convex toward an image side, wherein at least one of an object side surface and the image side surface of the fifth lens is an aspherical surface; and
a sixth lens having a refractive power and an image side surface that is concave toward the image side, wherein at least one of an object side surface and the image side surface of the sixth lens is an aspherical surface,
wherein the first to sixth lenses are arranged in an order from the object side to the image side, and the photographing lens system has a viewing angle in a range between about 80° to about 160°, and the photographing lens system satisfies an inequality that $|F1|/EFL>1$, where "F1" denotes a focal length of the first lens and "EFL" denotes a total focal length of the photographing lens system.

23. The photographing lens system of claim 22, satisfying an inequality that $$0<F3/EFL<5,$$

wherein "F3" denotes a focal length of the third lens and "EFL" denotes a total focal length of the photographing lens system.

24. The photographing lens system of claim 23, wherein the fourth lens comprises an object side surface that is concave toward the object side.

25. The photographing lens system of claim 23, satisfying an inequality that $$0.1<T4/T3<1,$$

wherein "T4" denotes a central thickness of the fourth lens and "T3" denotes a central thickness of the third lens.

26. The photographing lens system of claim 23, satisfying an inequality that $$Vd4/Vd3<1,$$

wherein "Vd4" denotes an Abbe number of the fourth lens and "Vd3" denotes an Abbe number of the third lens.

27. The photographing lens system of claim 23, satisfying an inequality that $$|R51/R52|>1,$$

wherein "R51" denotes a radius of curvature of the object side surface of the fifth lens and "R52" denotes a radius of curvature of the image side surface of the fifth lens.

28. The photographing lens system of claim 23, wherein the object side surface of the sixth lens is convex toward the object side.

29. The photographing lens system of claim 23, wherein the sixth lens has at least one inflection point on the image side surface.

30. The photographing lens system of claim 23, wherein each of the first to sixth lenses has at least one aspherical surface.

31. The photographing lens system of claim 23, wherein each of the first to sixth lenses includes a plastic lens.

32. The photographing lens system of claim 23, satisfying an inequality that $$IND\text{-}L4>1.6,$$

wherein "IND-L4" denotes a refractive index of the fourth lens.

33. The photographing lens system of claim 23, satisfying an inequality that $$80<FOV<160 \text{ (degrees)},$$

wherein "FOV" denotes a viewing angle.

34. A photographing lens system comprising:
a first lens having a meniscus shape that is concave toward an object side in an area around an optical axis;
a second lens having a refractive power, the second lens adjacent to the first lens;
a third lens having a positive refractive power and a convex image side surface at least at a central region thereof, the third lens adjacent to the second lens;
a fourth lens having a refractive power, the fourth lens adjacent to the third lens;
a fifth lens having a positive refractive power and an image side surface that is convex toward the image side, wherein at least one of an object side surface and the image side surface of the fifth lens is an aspherical surface, the fifth lens adjacent to the fourth lens; and
a sixth lens having a refractive power and an image side surface that is concave toward the image side, wherein at least one of an object side surface and the image side surface of the sixth lens is an aspherical surface, the sixth lens adjacent to the fifth lens,
wherein the photographing lens system satisfies an inequality that $$-0.25<EFL/F12<0.25,$$

wherein "F12" denotes a synthetic focal length of the first and second lenses and "EFL" denotes a total focal length of the photographing lens system.

35. A photographing apparatus comprising:
a photographing lens system; and
an image sensor receiving an image formed by the photographing lens system and converting a received image to an electric image signal,
wherein the photographing lens system comprises:
a first lens having at least one inflection point, an object side surface that is concave in an area around an optical axis, and an image side surface that is convex toward an image side;
a second lens having a refractive power;
a third lens having a positive refractive power;
a fourth lens having a refractive power;
a fifth lens having a refractive power and an image side surface that is convex toward the image side, wherein at least one of an object side surface and the image side surface of the fifth lens is an aspherical surface; and
a sixth lens having a refractive power and an image side surface that is concave toward the image side, wherein at least one of an object side surface and the image side surface of the sixth lens is an aspherical surface,
wherein the first to sixth lenses are arranged in an order from an object side to the image side, and the photographing lens system satisfies an inequality that $$|F1|/EFL>1,$$

where "F1" denotes a focal length of the first lens and "EFL" denotes a total focal length of the photographing lens system.

* * * * *